United States Patent
Shiozaki et al.

(10) Patent No.: US 8,179,089 B2
(45) Date of Patent: May 15, 2012

(54) POWER TRANSMISSION CONTROL APPARATUS, POWER TRANSMISSION APPARATUS, CONTACTLESS POWER TRANSMISSION SYSTEM, AND DATA DETERMINATION METHOD

(75) Inventors: Nobutaka Shiozaki, Nagoya (JP); Kota Onishi, Nagoya (JP); Masayuki Kamiyama, Nagoya (JP)

(73) Assignee: Seiko Epson Corporation, Tokyo (JP)

( * ) Notice: Subject to any disclaimer, the term of this patent is extended or adjusted under 35 U.S.C. 154(b) by 413 days.

(21) Appl. No.: 12/478,352

(22) Filed: Jun. 4, 2009

(65) Prior Publication Data
US 2009/0302800 A1    Dec. 10, 2009

(30) Foreign Application Priority Data
Jun. 10, 2008    (JP) ................. 2008-151564

(51) Int. Cl.
*H02J 7/00*    (2006.01)
(52) U.S. Cl. .................... 320/108; 320/106
(58) Field of Classification Search ........... 320/106–108
See application file for complete search history.

(56) References Cited

U.S. PATENT DOCUMENTS
6,975,092 B2 * 12/2005 Edington et al. ............. 320/106
2004/0145342 A1 * 7/2004 Lyon ............................. 320/108

FOREIGN PATENT DOCUMENTS
| JP | A-58-195394 | 11/1983 |
| JP | A-7-43008 | 2/1995 |
| JP | A-8-221108 | 8/1996 |
| JP | A-2006-60909 | 3/2006 |

* cited by examiner

*Primary Examiner* — Samuel Berhanu
(74) *Attorney, Agent, or Firm* — Oliff & Berridge, PLC

(57) ABSTRACT

A power transmission control apparatus is a power transmission control apparatus provided in a power transmission apparatus included in a contactless power transmission system where power is transmitted from the power transmission apparatus to a power reception apparatus by electromagnetically coupling a primary coil and a secondary coil. The power transmission control apparatus includes: a signal detection circuit that detects a signal induced by the primary coil; and a power transmission control circuit that determines a value of transmission data transmitted from the power reception apparatus by a load modulation, on the basis of an output signal of the signal detection circuit. The power transmission control circuit obtains detection data by detecting the transmission data on the basis of the output signal of the signal detection circuit at every drive clock cycle of the primary coil. If a value of the detection value is identical n-times continuously, where $n=m+\alpha \leq p$, the m is an integer equal to or larger than 0, the $\alpha$ is an integer equal to or larger than 1, and the p is an integer equal to or larger than 1, the power transmission control circuit determines that the value of the transmission data transmitted by the power reception apparatus is the value of the detection data.

12 Claims, 12 Drawing Sheets

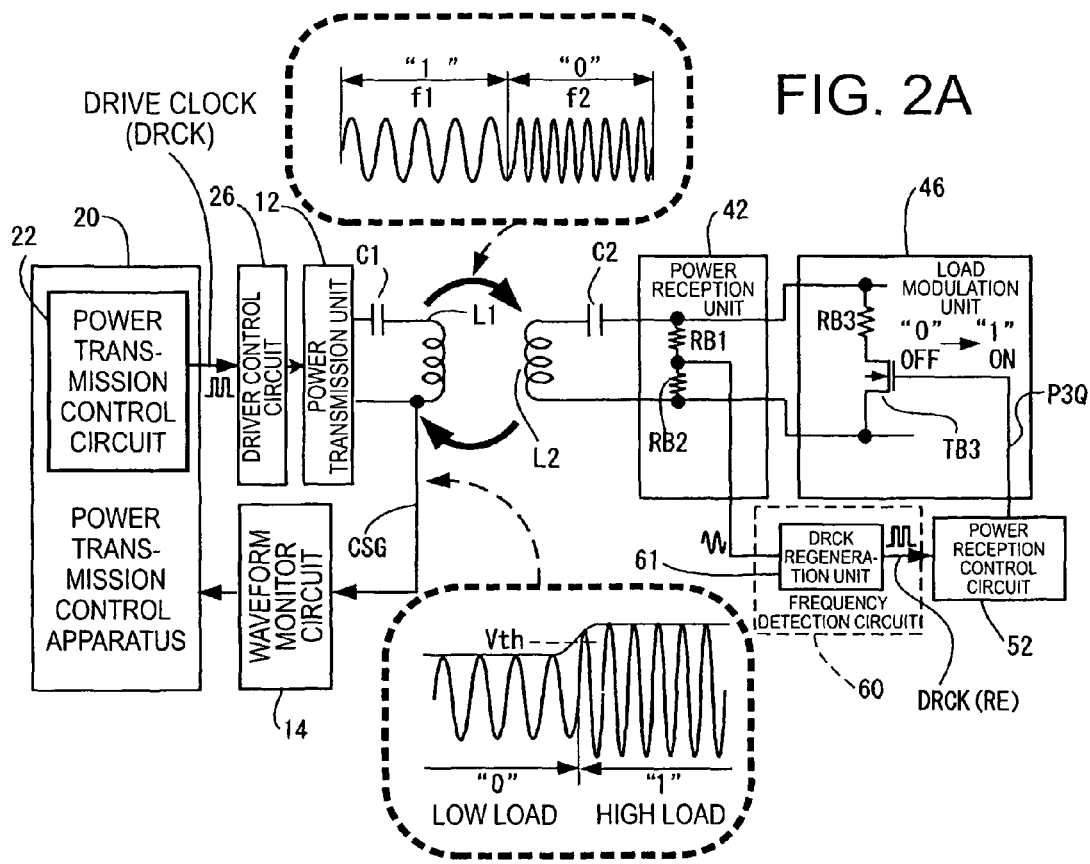
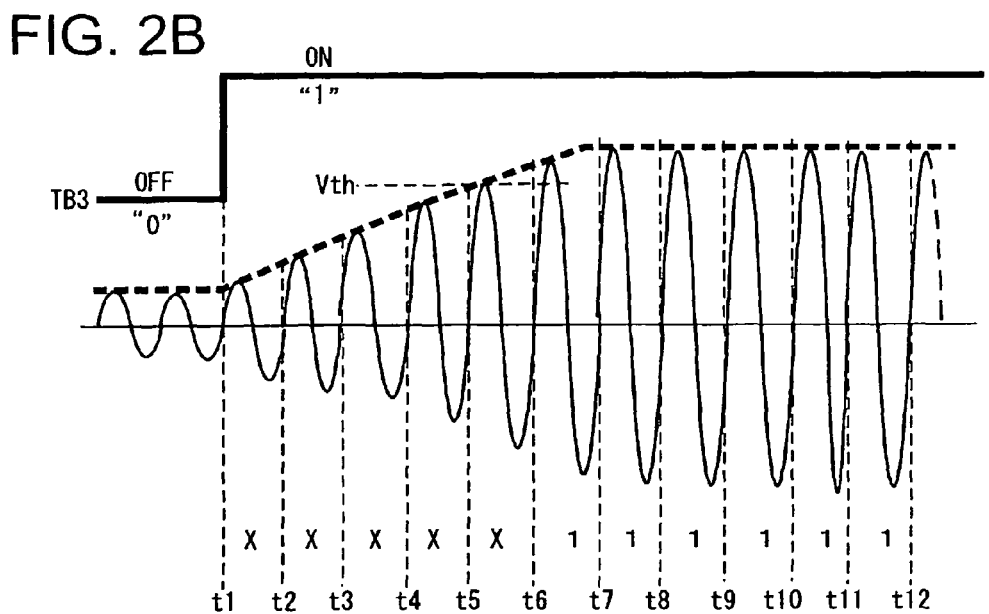

} PERIODIC AUTHENTICATION

} PACKET COMMUNICATION

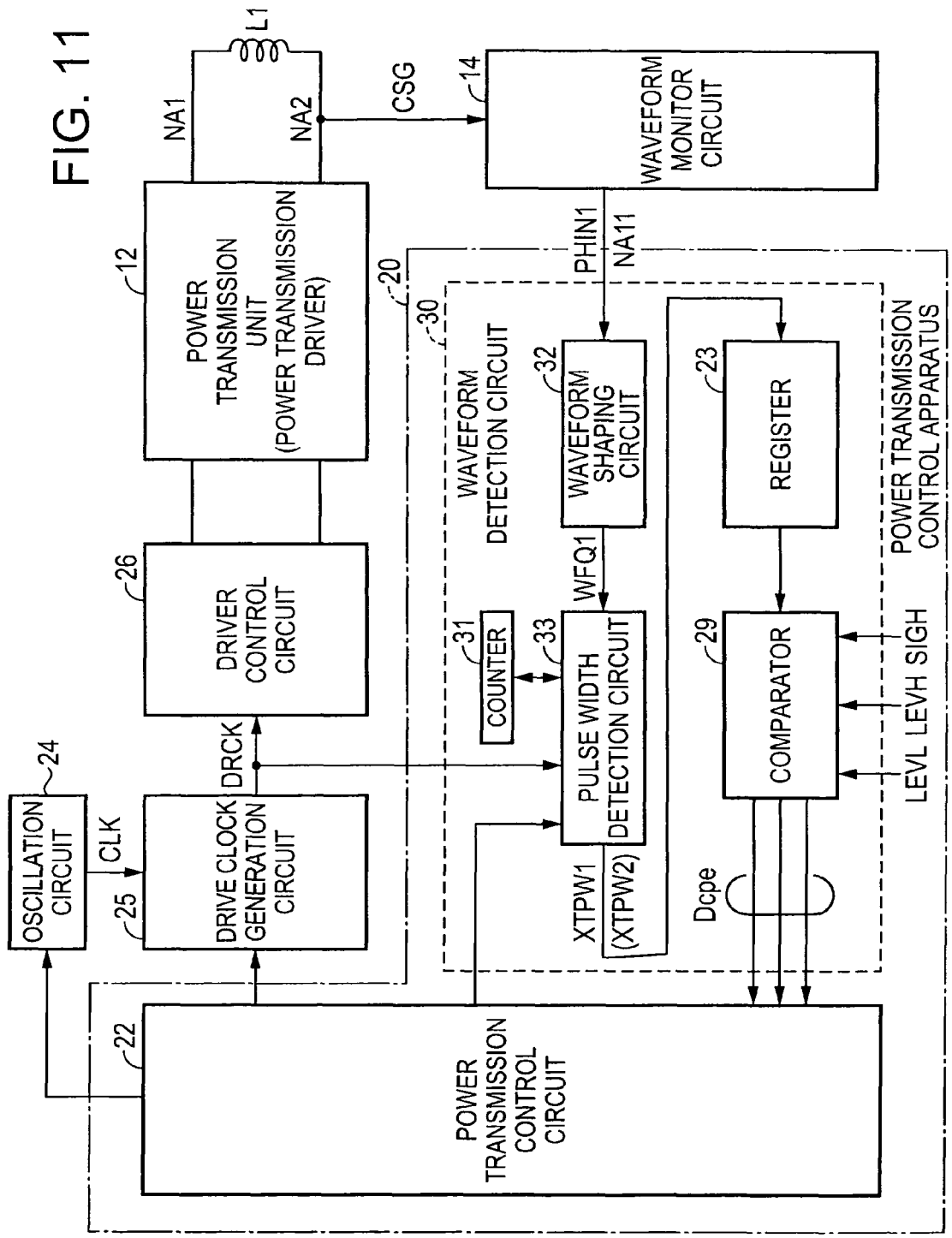

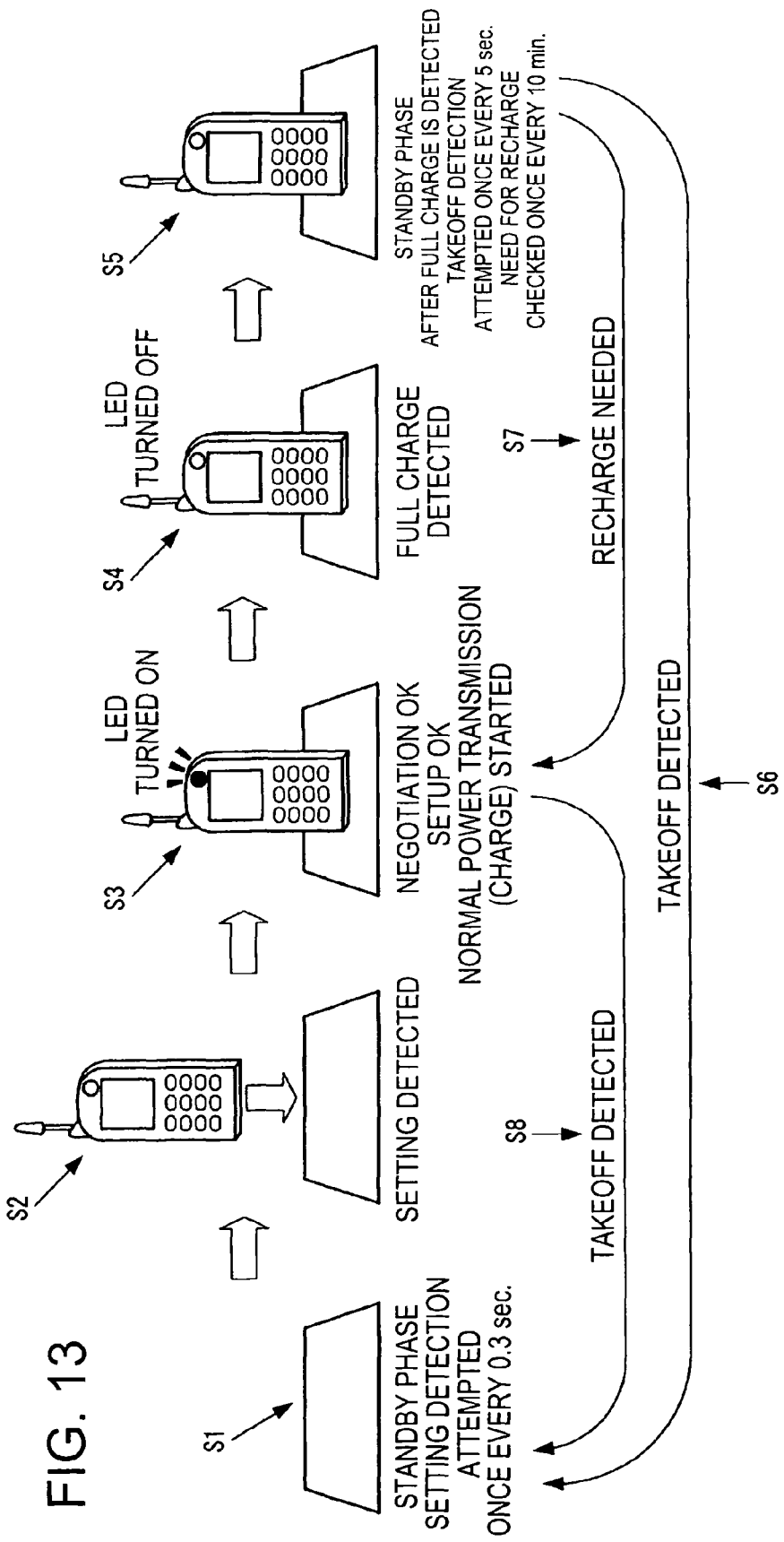

POWER TRANSMISSION CONTROL APPARATUS, POWER TRANSMISSION APPARATUS, CONTACTLESS POWER TRANSMISSION SYSTEM, AND DATA DETERMINATION METHOD

BACKGROUND

1. Technical Field

The present invention relates to a power transmission control apparatus, a power transmission apparatus, a contactless power transmission system, and a data determination method.

2. Related Art

Contactless power transmission that uses electromagnetic induction to transmit power without using a metal contact has come under the spotlight. As applications of contactless power transmission, charging of a cell phone, charging of a home appliance (e.g., a handset), and the like have been proposed.

A contactless power transmission apparatus using a primary coil and a secondary coil is described, for example, in JP-A-2006-60909. In the contactless power transmission system described in JP-A-2006-60909, a power transmission apparatus transmits data to a power reception apparatus by a frequency modulation. Also, the power reception apparatus transmits data to the power transmission apparatus by a load modulation.

The power reception apparatus described in JP-A-2006-60909 includes a variable load unit (load modulation unit) and turns on or off a MOS (metal oxide semiconductor) transistor for a load modulation provided in the variable load unit (load modulation unit) to transmit data to the power transmission apparatus via the secondary coil and primary coil.

When the load state of the power reception apparatus changes due to the turning-on or turning-off of the MOS transistor, for example, the voltage amplitude of the coil end of the primary coil is increased or reduced. On the other hand, the power transmission apparatus monitors the coil end voltage of the primary coil, for example, and compares the amplitude of the coil end voltage with a threshold, to determine whether data transmitted from the power reception apparatus is "0" or "1".

The power transmission apparatus must reliably and rapidly determine data transmitted from the power reception apparatus using load modulation. Also, it is preferable that the configuration and operations of a data determination circuit provided in the power transmission apparatus be simplified as much as possible.

When the power transmission apparatus receives a communication packet transmitted from the power reception apparatus, for example, bit synchronization (initial synchronization) is first established and then data is determined on the basis of a signal (coil end signal) obtained from the coil end. For example, immediately after the power transmission apparatus starts, bit synchronization is yet to be established between the power transmission apparatus and power reception apparatus; therefore, first, a bit synchronization (initial synchronization) process must be performed to obtain a proper data determination timing.

Once a proper timing for determining received data is obtained by performing bit synchronization (initial synchronization), data transmitted from the power reception apparatus is preferably determined, for example, at predetermined intervals.

However, if an erroneous timing is obtained by performing bit synchronization (initial synchronization), data transmitted from the power reception apparatus can no longer be determined correctly. Therefore, it is necessary to obtain a proper data determination timing with caution and reliability in a process that has a large influence over later data determination timings, such as a bit synchronization (initial synchronization) process. On the other hand, a bit synchronization (initial synchronization) process must be performed efficiently and rapidly.

In addition to sending communication packets, the power reception apparatus may transmit periodic authentication data having a predetermined pattern to the power transmission apparatus periodically (e.g., every second). Periodic authentication is performed, for example, to detect a so-called "takeover state."

Specifically, if, for example, a plate-shaped conductive foreign object (metal foreign object) having a large area is inserted between the primary coil and secondary coil after the power transmission apparatus starts normal power transmission to the power reception apparatus, the transmitted power is continuously consumed by the metal foreign object. Therefore, even after the power reception apparatus is removed, the power transmission apparatus determines that the power reception apparatus still exists as a load, and continues the normal power transmission. This state is called as a "takeover state." The takeover state may heat the metal foreign object to a high temperature, causing a burn, a machine break, or the like.

For this reason, the power reception apparatus performs a periodic authentication process (a process of modulating the load periodically) and transmits data having a predetermined pattern (e.g., "0," "1," "0") to the power transmission apparatus.

The power transmission apparatus detects whether a takeover state has occurred, depending on whether it can detect periodic authentication data periodically transmitted from the power reception apparatus. Specifically, once a takeover state occurs, periodic authentication data transmitted from the power reception apparatus no longer reaches the power transmission apparatus. Thus, the power transmission apparatus detects that the takeover state has occurred. Upon detection of the takeover state, the power transmission apparatus stops the normal power transmission.

When the power transmission apparatus first receives periodic authentication data transmission from the power reception apparatus, it must determine the periodic authentication data with caution and reliability to obtain a proper periodic authentication data determination timing, as in the above-mentioned bit synchronization (initial synchronization) process. Once a proper periodic authentication data determination timing is obtained, a periodic authentication data determination process is preferably performed, for example, at predetermined intervals.

However, the power transmission apparatus of the contactless power transmission system according to the related-art example cannot reliably and rapidly perform a bit synchronization (initial synchronization) process and, for example, a process of determining first received periodic authentication data.

Also, in the related-art example, the power transmission apparatus cannot receive a communication packet and periodic authentication data transmitted from the power reception apparatus, as distinguished from each other.

SUMMARY

An advantage of the invention is to provide a power transmission apparatus that is included in a contactless power transmission system, is allowed to reliably and rapidly perform a bit synchronization (initial synchronization) process, a first-received periodic authentication data determination process, or the like, and has a simplified data determination processing circuit. Another advantage of the invention is to provide a power transmission apparatus that is included in a contactless power transmission system, and is allowed to receive periodic authentication data and a communication packet transmitted from a power reception apparatus, as distinguished from each other.

A power transmission control apparatus according to a first aspect of the invention is a power transmission control apparatus provided in a power transmission apparatus included in a contactless power transmission system where power is transmitted from the power transmission apparatus to a power reception apparatus by electromagnetically coupling a primary coil and a secondary coil. The power transmission control apparatus includes: a signal detection circuit that detects a signal induced in the primary coil; and a power transmission control circuit that determines a value of transmission data transmitted from the power reception apparatus by a load modulation, on the basis of an output signal of the signal detection circuit. The power transmission control circuit obtains detection data by detecting the transmission data on the basis of the output signal of the signal detection circuit at every drive clock cycle of the primary coil. If a value of the detection value is identical n-times continuously, where $n=m+\alpha \leq p$, the m is an integer equal to or larger than 0, the $\alpha$ is an integer equal to or larger than 1, and the p is an integer equal to or larger than 1, the power transmission control circuit determines that the value of the transmission data transmitted by the power reception apparatus is the value of the detection data.

In the contactless power transmission system, the power transmission apparatus AC-drives the primary coil using a drive clock. The power reception apparatus regenerates the drive clock of the primary coil, for example, by shaping the waveform of a sinusoidal signal obtained from the secondary coil end, and turns on or off a load modulation transistor of a load modulation unit in synchronization with the regenerated drive clock so as to change the state of a load of the power reception apparatus. Thus, "0" or "1" is transmitted from the power reception apparatus to the power transmission apparatus. That is, the power reception apparatus modulates the load using the drive clock of the primary coil as a timing reference so as to transmit transmission data to the power transmission apparatus.

As for communications using load modulation, it is preferable that a communication rule such as one where one-bit data ("0" or "1") continues over a period corresponding to p drive clocks be stipulated.

The power transmission control apparatus included in the power transmission apparatus determines the value ("0" or "1") of data transmitted from the power reception apparatus by the load modulation, on the basis of an output signal of the signal detection circuit (including, for example, a waveform detection circuit). A period over which one-bit data, "0" or "1", transmitted from the power reception apparatus to the power transmission apparatus continues is set to k-times (k is an integer equal to or larger than 1) a period corresponding to p (p is an integer equal to or larger than 2) drive clocks of the primary coil. For example, if p=16 and k=1, the data length of one bit corresponds to 16 drive clocks of the primary coil. For example, if p=16 and k=2, the data length of one bit corresponds to 32 drive clocks of the primary coil.

A problem caused when the power transmission control apparatus determines whether received data (that is, transmission data transmitted from the power reception apparatus by the load modulation) is "0" or "1" is the existence of a data-undetermined period. Specifically, when the power reception apparatus modulates the load thereof to change the load state, there exists a data-undetermined period that continues from the timing when the load state of the power reception apparatus has been changed to a time when the power transmission apparatus can stably detect the change in the load state of the power reception apparatus and that corresponds to m (m is an integer equal to or larger than 0) drive clocks of the primary coil. For example, when the power reception apparatus modulates the load to change the value of transmission data from "0" to "1", a lapse of a certain length of time is required until the level of the coil end signal (e.g., coil end voltage) of the primary coil is changed from a level corresponding to "0" to a level corresponding to "1". During a data-undetermined period, a signal (coil end signal) obtained from the coil end of the primary coil is unstable and is less reliable. Therefore, if it is determined whether transmission data is "0" or "1", on the basis of only received data obtained during a data-undetermined period, there is a high possibility that an erroneous determination is made.

For this reason, this aspect of the invention adopts the following data determination method (n-times continuous matching determination method). That is, detection data is obtained by detecting transmission data at every drive clock cycle of the primary coil, and if detection data having an identical value is detected n-times ($n=m+\alpha \leq p$, where $\alpha$ is an integer equal to or larger than 1) continuously, the value of the detection data is considered as the value of the transmission data so that the value is determined.

For example, assume that there exists a data-undetermined period corresponding to 5 drive clocks of the primary coil (m=5) and that one-bit data continues over a period corresponding to 16 drive clocks of the primary coil (that is, p=16, k=1). Also, assume that if an identical value is detected seven times continuously (n=7(<16), $\alpha$=2), the value is determined. While the value of m is typically equal to or larger than 1, it cannot be said that there is no case where a change in transmission data due to the load modulation performed by the power reception apparatus is rapidly transmitted to the power transmission apparatus so that a communication delay becomes smaller than one drive clock cycle of the primary coil (in this case, m=0 and there is substantially no data-undetermined period). Therefore, this aspect of the invention also considers a case where m=0.

For example, assume that the power transmission control apparatus has determined detection data (received data) as "1" seven times continuously. That is, assume that "1" "1" "1" "1" "1" "1" "1" have been detected. In this case, there is a possibility that the first five "1" "1" "1" "1" "1" are less reliable determination results on the basis of data obtained during a data-undetermined period. However, the subsequent two "1" "1" are determination results on the basis of highly reliable received data. If an identical value is detected seven times continuously, it can be determined that there is a high possibility that received data (that is, transmission data) has been changed from "0" to "1".

That is, if an identical value is detected n-times (n=m+ $\alpha \leq p$, where $\alpha$ is an integer equal to or larger than 1) continuously, the n pieces of received data that have served as the base for the determination include at least a pieces of highly reliable data and therefore have acceptable reliability. If received data is significantly unstable, the multiple detection values must include one or so different value. That is, if no different value appears and an identical value is detected n-times continuously, it can be considered that the pieces of received data have at least a common tendency (for example, the voltage amplitude of the coil end signal tends to increase). Therefore, it can be considered that the n-times continuously detected value is a probable value.

Therefore, by performing n-times continuous matching determinations, a highly reliable data determination is realized regardless of whether there exists a data-undetermined period. Note that since a period over which one-bit data continues is a period corresponding to p drive clocks of the primary coil, the number of pieces of data that can be used in a one-bit data determination process (n-times continuous matching determination process) does not exceed p. This is represented by $n \leq p$.

As the value of n (value of $\alpha$) is increased, the reliability of a data determination result is increased. On the other hand, the time required until the value of data is determined is increased. Therefore, it is preferable to determine the value of n (value of $\alpha$) in consideration of both the reliability of data determinations and the processing time.

In the power transmission control circuit according to the first aspect of the invention, in a case where values of periodic authentication data including output signal "0" "1" "0" periodically transmitted from the power reception apparatus are determined and where a timing of a change from the "0" to the "1" of the periodic authentication data is a time tx and a timing of a change from the "1" to the "0" is a time when a period corresponding to p-times one drive clock cycle of the primary coil has elapsed from the time tx, by detecting "1" n-times continuously, the power transmission control circuit preferably determines the detected "1" and thus detects the change from the "0" to the "1" of the transmission data, and subsequently, by detecting "0" n-times continuously in a period after a period corresponding to (p+m) drive clocks of the primary coil has elapsed from the time tx and before a period corresponding to (2×p) drive clocks of the primary coil elapses from the time tx, the power transmission control circuit preferably determines the "0" and thus preferably detects the change from the "1" to "0" of the transmission data.

By using the n-times continuous matching determination method, the power transmission control apparatus reliably detects periodic authentication data transmitted from the power reception apparatus. This will be described using the above-mentioned example. Assume that there exist data-undetermined periods corresponding to 5 drive clocks of the primary coil (m=5) and that one-bit data continues over a period corresponding to 16 drive clocks of the primary coil (that is, p=16, k=1). Also, assume that if an identical value is detected seven times continuously (n=7(<16), $\alpha$=2), the identical value is determined.

The power reception apparatus transmits "0" "1" "0" by modulating the load thereof. The power transmission control apparatus detects that the received data has changed from "0" to "1", by performing seven times continuous matching determinations. If the received data is periodic authentication data, "1" must continue over a period corresponding to 16 drive clocks and then "1" must be changed to "0". Therefore, after the power transmission control apparatus detects a change from "0" to "1", it detects a subsequent change from "1" to "0" using the seven times continuous matching determination method. That is, if the power transmission control apparatus detects "1" by performing seven times continuous matching determinations and then detects "0" by performing seven times continuous matching determinations again, it may determine that the received data is periodic authentication data.

Assume that the load state of the power reception apparatus is changed from "0" to "1" to "0". In this case, a data-undetermined period corresponding to 5 drive clocks exists in the course of the change from "0" to "1". Similarly, a data-undetermined period corresponding to 5 drive clocks exists in the course of the change from "1" to "0". The latter data-undetermined period corresponding to 5 drive clocks becomes an obstacle to detecting the change from "1" to "0". However, it is known that the period over which "1" continues is a period corresponding to 16 clocks. Therefore, when the second data-undetermined period will occur can be predicted by using the timing when the first "1" has been detected as a start point. Thus, the timing for stating seven times continuous matching determinations to detect "0" after detecting the "1" is set in a period after the second data-undetermined period ends.

That is, the power reception apparatus modulates the load thereof at the time tx to change transmission data from "0" to "1". From the time tx, "1" continues over a period corresponding to p (here, p=16) drive clocks. Subsequently, the power reception apparatus changes transmission data from "1" to "0" at a time (tx+p·t), where t is one cycle of a drive clock. The time (tx+p·t) represents a time when a period (p·t) corresponding to p clocks has elapsed from the time tx. Subsequently, there exists a data-undetermined period corresponding to m clocks. The data-undetermined period (second data-undetermined period) ends at a time (tx+p·t+m·t). The time (tx+p·t+m·t) represents a time when a period (m·t) corresponding to m clocks has elapsed from the time (tx+p·t).

Also, since the length of one-bit corresponds to p drive clocks, "0" must continue from the time (tx+p·t) to a time (that is, a time (tx+2·p·t); here, a time when a period corresponding to 32 clocks has elapsed from the time tx) when a period corresponding to at least p clocks has elapsed. Therefore, if n-times (here, n=7) continuous matching determinations are performed within a period (including the time (tx+2·p·t)) from the time (tx+p·t+m·t) to the time (tx+2·p·t), it is possible to determine whether received data is "0", on the basis of only highly reliable data while avoiding the second data-undetermined period.

That is, the power transmission control apparatus detects the change from "0" to "1" and subsequently detects data at every drive clock cycle of the primary coil in a period after a period corresponding to (p+m) drive clocks of the primary coil has elapsed from the time tx and before a period corresponding to (2×p) drive clocks of the primary coil elapses from the time tx. As a result, if "0" is detected n-times continuously, the detected "0" is determined. This "0" determination is highly reliable because the determination has been made while avoiding data-undetermined periods. Thus, power transmission control apparatus reliably detects the change from "1" to "0" and correctly detects that the received data is periodic authentication data.

In the above-mentioned description, a state in which the load of the power reception apparatus is light is associated with "0" and a state in which the load of the power reception apparatus is heavy is associated with "1". However, in contrast, a state in which the load of the power reception apparatus is heavy may be associated with "0" and a state in which the load of the power reception apparatus is light may be associated with "1". In this case, the power reception apparatus transmits periodic authentication data "1" "0" "1" by modulating the load thereof Even if "0" is replaced with "1" and "1" is replaced with "0" in the above-mentioned description, the operations according to this embodiment are not affected at all and both types of periodic authentication data are equivalent to each other. This applies to all the description in this specification.

In the power transmission control circuit according to the first aspect of the invention, only when first receiving the periodic authentication data, the power transmission control circuit preferably determines the periodic authentication data using a method, the method being a method of determining the value of the transmission data by detecting an identical value n-times continuously. After detecting the change from the "1" to the "0", the power transmission control circuit preferably determines the value of the transmission data every cycle from the timing when the change from the "1" to the "0" has been detected, the cycle being a period corresponding to p drive clocks of the primary coil.

Periodic authentication data is periodically transmitted from the power reception apparatus, and the power transmission control apparatus reliably detects periodic authentication data by performing n-times continuous matching determinations. However, if the power transmission control apparatus always performs n-times continuous matching determinations, the time required for the determined process is increased and the processing load put on the determination circuit is increased. Also, it can be considered that if the power transmission control apparatus correctly detects first periodic authentication data and thereafter determines whether received data is "0" or "1" every p (e.g., 16) drive clocks, it can perform data determinations (data sampling) without reducing the determination accuracy while avoiding data-undetermined periods.

For this reason, only when receiving the first periodic authentication data, the power transmission control apparatus performs n-times continuous matching determinations, and after detecting the first periodic authentication data, the power transmission control apparatus determines whether received data is "0" or "1", every cycle (one cycle corresponds to p (e.g., 16) drive clocks) using the detection timing (for example, the timing when "0" has been determined). This reduces the processing load put on the power transmission control apparatus, as well as speeds up the periodic authentication data detection process.

In the power transmission control circuit according to the first aspect of the invention, in a case in which a value of a communication packet transmitted from the power reception apparatus, the communication packet including one of "0" and "1," is determined and in which a period over which one of the "0" and the "1" continues is a period corresponding to q (q=β×p, where β is an integer equal to or larger than 2) drive clocks of the primary coil, and a change from the "0" to the "1" occurs at a time ty due to the load modulation performed by the power reception apparatus, the power transmission control circuit preferably detects the change from the "0" to the "1" by detecting "1" n-times continuously. Subsequently, the power transmission control circuit preferably detects a change from "1" to "1" by detecting "1" n-times continuously in a period after a period corresponding to (p+m) drive clocks of the primary coil has elapsed from the time ty and before a period corresponding to (2×p) drive clocks of the primary coil elapses from the time ty.

In this aspect of the invention, a communication packet transmitted from the power reception apparatus is detected by performing n-times continuous matching determinations. A process for detecting a communication packet is similar to a process for detecting periodic authentication data. However, for periodic authentication data, "1" continues over a period corresponding to p clocks (e.g., 16 clocks); for a communication packet, "1" continues over a period corresponding to q(=β×p, if β=2, q=32) clocks. By using this difference, periodic authentication data and a communication packet are detected as distinguished from each other.

Specifically, the power transmission control apparatus first determines "1" by performing n-times continuous matching determinations, and thus detects a change from "0" to "1". Subsequently, the power transmission control apparatus detects data at every drive clock cycle of the primary coil in a period after a period corresponding to (p+m) drive clocks of the primary coil has elapsed and before a period corresponding to (2×p) drive clocks of the primary coil elapses. If the power transmission control apparatus detects "1" n-times continuously, it determines the detected "1" and thus detects a change from "1" to "1".

For example, assume that p=16 and q=32 and that detection is performed using 16 clocks as one unit. For periodic authentication data, "0" "1" "0" are detected. On the other hand, for a communication packet, "0" "1" "1" are detected, that is, "1" is detected twice continuously. Thus, it is determined that the received data is a communication packet. Also, as for the determination of the second "1", n-times continuous matching determinations have been performed while avoiding data-undetermined periods. In this way, data can be determined on the basis of only highly reliable data. As a result, the determination accuracy is improved.

In the power transmission control circuit according to the first aspect of the invention, only for a purpose of determining first one-bit data of the communication packet first received in a state in which initial synchronization between the power transmission apparatus and the power reception apparatus is yet to be established, the power transmission control circuit preferably uses a method, the method being a method of determining the value of the transmission data by detecting an identical value n-times continuously. By detecting "1" n-times continuously in a period after a period corresponding to (p+m) drive clocks of the primary coil has elapsed from the time ty and before a period corresponding to (2×p) drive clocks of the primary coil elapses from the time ty, the power transmission control apparatus preferably determines the detected "1" and thus preferably detects a change from the "0" to the "1" and thereafter preferably determines the value of the transmission data every cycle, the cycle being a period corresponding to p drive clocks of the primary coil, from one of a timing when the "1" has been determined and a subsequent determination timing determined on the basis of the timing when the "1" has been determined.

If n-times continuous matching determinations are always performed to determine data of a communication packet, the time required for the determination process is increased and the processing load put on the determination circuit is increased. Also, if a first communication packet is correctly detected, a proper timing for receiving a communication packet is found and bit synchronization is established. Therefore, thereafter, whether received data is "0" or "1" is determined every p (e.g., 16) drive clocks. In this case, data determinations (data sampling) are performed without reducing the determination accuracy while avoiding data-undetermined periods.

That is, only when first receiving data, the power transmission control apparatus performs n-times continuous matching determinations, and after detecting the first communication packet, the power transmission control apparatus determines whether received data is "0" or "1", every cycle (one cycle corresponds to p (e.g., 16) drive clocks) using, as a reference, the detection timing (for example, the timing when the second "1" has been determined) or a timing when a predetermined period has elapsed from the determination timing. This reduces the processing load put on the power transmission control apparatus, as well as speeds up the communication packet detection process.

In the power transmission control circuit according to the first aspect of the invention, the m is preferably 5, the n is preferably 7 (therefore, $\alpha$ is 2), and the p is preferably 16.

If there exist data-undetermined periods corresponding to 5 drive clocks, the value of n used when n-times ($n=m+\alpha$) continuous matching determinations are performed is preferably set to a proper value in comprehensive consideration of the reliability of data determinations, a reduction in the determination processing time, the length (that is, the value of p (in this aspect of the invention, $p=16$) of a period over which one-bit data continues, and the like, If there exist data-undetermined periods corresponding to 5 drive clocks, there is a possibility that the data-undetermined periods slightly vary. Therefore, if $n=6$ (therefore, $\alpha=1$), the reliability of data determinations is not sufficiently ensured. If $n=7$, there is an allowance of 2 clocks in addition to a data-undetermined period (5 clocks). Therefore, even if a data-undetermined period varies and thus corresponds to 6 clocks, there remains an allowance of one clock. That is, even in the worst case, the data serving as the base for a determination includes highly reliable data.

Also, if the value of n is further increased like $n=8, n=9, \ldots$ etc., the reliability of data determinations by performing n-times continuous matching determinations is increased. However, there occur adverse effects that the processing time required to determine data is increased and the determination circuit is complicated. Also, if one bit corresponds to 16 clocks, it is preferable to complete n-time continuous determinations within a period over which the one-bit continues and that corresponds to 16 clocks (otherwise, data may be determined in the subsequent data-undetermined period, resulting in a reduction in the reliability of data determinations). Therefore, the n value has an upper limit.

In view of the foregoing, in this aspect of the invention, if $m=5$ and $p=16$ (the value of k is, e.g., 1), n is set to 7. The value of n is set to an optimum value in comprehensive consideration of the reliability of data determinations, a reduction in the determination process time, the length of a period over which one-bit data continues, and the like. Thus, a highly reliable data determination is performed without putting an excess load on the data determination circuit provided in the power transmission apparatus and without complicating the data determination process. However, the value of n is not limited to the above-mentioned example.

In the power transmission control circuit according to the first aspect of the invention, the q is preferably 32 (therefore, the $\beta$ is 2).

While a period over which one bit of periodic authentication data continues is set to a period corresponding to 16 clocks, a period over which one bit of a communication packet continues is set to a period corresponding to 32 clocks ($\beta=2$). That is, the bit length of a communication packet is set to a multiple (twice) of 16. In this case, by performing data determinations using a period corresponding to 16 clocks as one unit, the power transmission control apparatus easily determines whether received data is periodic authentication data or a communication packet. Accordingly, a data determination process performed in the power transmission apparatus is simplified. Incidentally, if the bit length of a communication packet is further increased (for example, a length corresponding to 48 clocks), the time required to transmit or receive data is increased. Therefore, it is preferable that when a period over which one bit of periodic authentication data continues is set to a period corresponding to 16 clocks, a period over which one bit of a communication packet continues be set to a period ($\beta=2$) corresponding to 32 clocks. However, the bit length of a communication packet is not limited to this example.

A power transmission apparatus according to a second aspect of the invention includes the power transmission control apparatus according to the first aspect of the invention.

The power transmission apparatus according to this aspect of the invention reliably and rapidly performs, for example, a bit synchronization (initial synchronization) process, a first received periodic authentication data determination process, and the like. Also, for example, the data determination processing circuit (data determination unit) is simplified. Also, for example, the power transmission apparatus receives a communication packet and periodic authentication data transmitted from the power reception apparatus, as distinguished from each other. As a result, a highly reliable, convenient-to-use power transmission apparatus is obtained.

A contactless power transmission system according to a third aspect of the invention includes: a primary coil; a secondary coil; the power transmission apparatus according to the second aspect of the invention; and a power reception apparatus that receives power transmitted from the power transmission apparatus via the primary coil and the secondary coil and transmits the power to a load, the load being a subject of power feeding, and transmits data to the power transmission apparatus by a load modulation.

In the contactless power transmission system according to this aspect of the invention, the power transmission apparatus reliably and rapidly performs, for example, a bit synchronization (initial synchronization) process, a first-received periodic authentication data determination process, and the like. Also, for example, the data determination processing circuit provided in the power transmission apparatus is simplified. Also, for example, the power transmission apparatus receives a communication packet and periodic authentication data transmitted from the power reception apparatus, as distinguished from each other. As a result, a highly reliable, convenient-to-use contactless power transmission system is obtained.

A data determination method according to a fourth aspect of the invention is a data determination method used by a contactless power transmission system where power is transmitted from a power transmission apparatus to a power reception apparatus by electromagnetically coupling a primary coil and a secondary coil. The method is used when the power transmission apparatus determines a value of transmission data transmitted when the power reception apparatus performs a load modulation using a drive clock of the primary coil as a timing reference. The method includes: obtaining detection data by detecting the transmission data at every drive clock cycle of the primary coil; and if a value of the detection value is identical n-times ($n=m+\alpha \leq p$, where the m is an integer equal to or larger than 0, the $\alpha$ is an integer equal to or larger than 1, and the p is an integer equal to or larger than 1) continuously, determining that the value of the transmission data transmitted by the power reception apparatus is the value of the detection data. In this case, a period from a timing of the load modulation to a time when a period corresponding to m-times one cycle of a drive clock for driving the primary coil has elapsed is preferably defined as a data-undetermined period, the m being an integer equal to or larger than 0. Also, a period "0" or "1" included in 1 bit transmitted from the power reception apparatus by the load modulation is preferably set to k-times a period, the period being p-times one cycle of the drive clock, the k being an integer equal to or larger than 1.

By using the data determination method according to this aspect of the invention, for example, a bit synchronization (initial synchronization) process, a first-received periodic authentication data determination process, and the like are performed reliably and rapidly. Also, the data determination method according to this aspect of the invention is a method of making a determination multiple times continuously in synchronization with a drive clock (that is, a data determination reference clock) of the primary coil (that is, a reference clock for data determination). Therefore, this method is easily performed without requiring a special circuit. Accordingly, the data determination processing circuit (data determination unit) is simplified.

In the data determination method according to the fourth aspect of the invention, the m is preferably 5, the n is preferably 7 (therefore, α is 2), and the p is preferably 16.

The value of n is preferably set to a proper value in comprehensive consideration of the length of a data-undetermined period, the reliability of data determinations, a reduction in the determination processing time, the length (that is, the value of p (in this aspect of the invention, p=16)) of a period over which one-bit data continues, and the like. In view of the going, in this aspect of the invention, when m=5 and p=16 (the value of k is, e.g., 1), n is set to 7 so that the value of n is optimized. Thus, a highly reliable data determination is performed without putting an excess load on the data determination circuit provided in the power transmission apparatus and without complicating the data determination process. However, the value of n is not limited to the above-mentioned example.

BRIEF DESCRIPTION OF THE DRAWINGS

The invention will be described with reference to the accompanying drawings, wherein like reference numerals represent like elements.

FIGS. 2A and 2B are drawings showing data communications between a power transmission apparatus and a power reception apparatus.

FIG. 11 is a drawing showing an example configuration of the power transmission apparatus.

FIG. 13 is a drawing showing example operations of the contactless power transmission system.

DESCRIPTION OF EXEMPLARY EMBODIMENT

Now, a preferred embodiment of the invention will be described in detail. The embodiment described below does not unduly limit the invention as set forth in the appended claims. Also, not all the configurations described in the embodiment are essential as means for solving the above-mentioned problems.

Configurations of Electronic Apparatuses

Figure 1A:
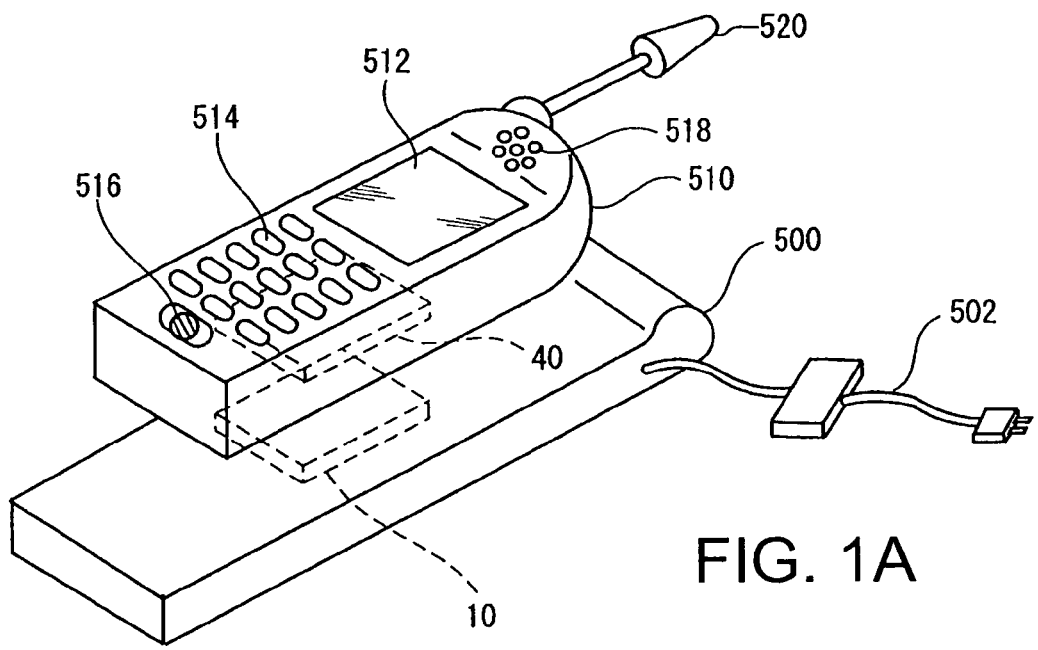
FIGS. 1A to 1C are drawings showing an example configuration of a contactless power transmission system.
Figure 1B:
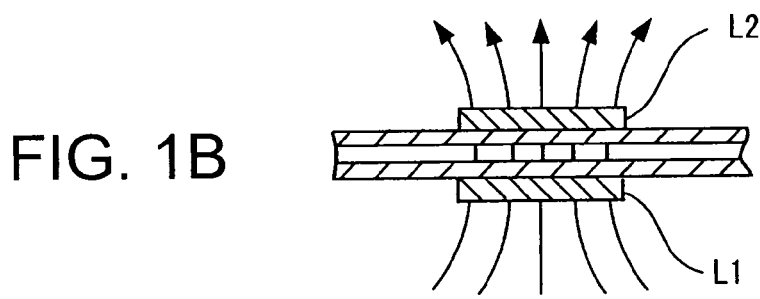
Figure 1C:
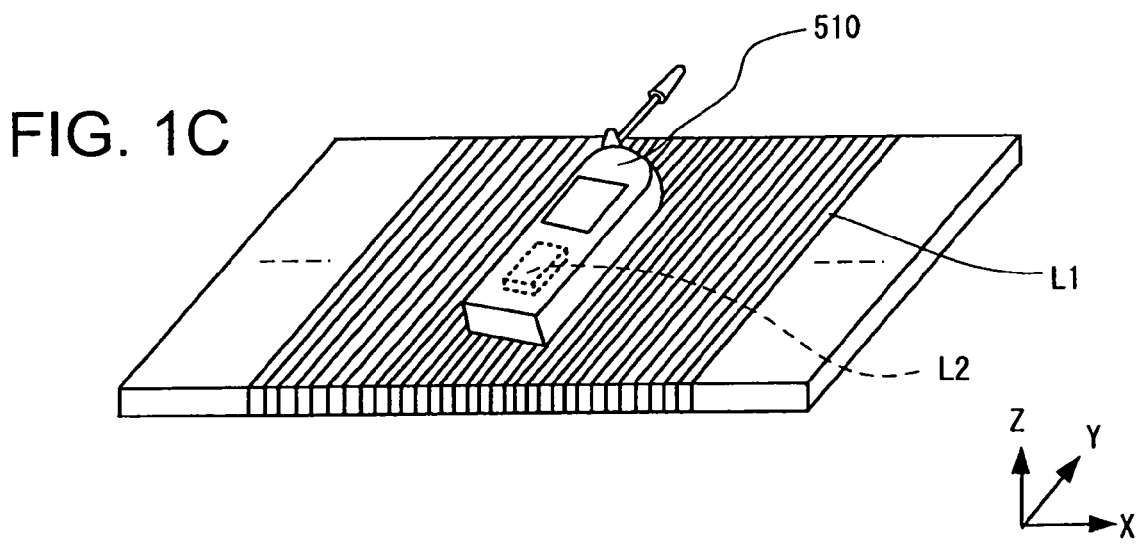

FIGS. 1A to 1C are drawings showing an example configuration of a contactless power transmission system. FIG. 1A shows an example of an electronic apparatus to which a contactless power transmission method according to this embodiment is applied. A charger 500 (cradle), which is an example of an electronic apparatus, includes a power transmission apparatus 10. A cell phone 510, which is an example of an electronic apparatus, includes a power reception apparatus 40. The cell phone 510 includes a display unit 512 such as a liquid crystal display (LCD), an operation unit 514 including buttons and the like, a microphone 516 (audio input unit), a speaker 518 (audio output unit), and an antenna 520.

The charger 500 receives power via an AC adapter 502, and the power transmission apparatus 10 transmits the received power to the power reception apparatus 40 by means of contactless power transmission. In this way, for example, a battery of the cell phone 510 is charged or a device of the cell phone 510 operates.

Note that an electronic apparatus to which this embodiment is applicable is not limited to the cell phone 510. For example, this embodiment is applicable to various electronic apparatuses such as a wristwatch, a handset, a shaver, an electric toothbrush, a wrist computer, a handy terminal, a portable information terminal, an electric bicycles, and an IC card.

As schematically shown in FIG. 1B, power is transmitted from the power transmission apparatus 10 to the power reception apparatus 40 by electromagnetically coupling a primary coil L1 (power transmission coil) included in the power transmission apparatus 10 and a secondary coil L2 (power reception coil) included in the power reception apparatus 40 and thus forming a power transmission transformer. Thus, contactless power transmission is realized.

In FIG. 1B, the primary coil L1 and secondary coil L2 are, for example, air-core flat coils formed by wiring a coil wire on a plane spirally. However, coils according to this embodiment are not limited thereto and may have any shape, structure, or the like as long as they are configured to transmit power by electromagnetically couple the primary coil L1 and secondary coil L2.

For example, in FIG. 1C, the primary coil L1 is formed by winding a coil wire around the X axis of a magnetic substance core parallel. The same goes for the secondary coil L2 included in the cell phone 510. This embodiment is also applicable to the coils as shown in FIG. 1C. As for FIG. 1C, the primary coil L1 or secondary coil L2 may be a combination of a coil formed by winding a coil wire about the X axis and a coil formed by winding a coil wire about the Y axis.

Data Communication Between Power Transmission Apparatus and Power Reception Apparatus FIGS. 2A and 2B are drawings showing data communication between the power transmission apparatus and power reception apparatus.

As shown in FIG. 2A, the power transmission apparatus includes a power transmission control apparatus 20 including a power transmission control circuit 22, a driver control circuit 26, a power transmission unit (power transmission driver) 12, a waveform monitor circuit 14, the primary coil L1, and a capacitor C1 connected to the primary coil L1 in series. The power transmission control apparatus 20 centrally controls operations of the power transmission apparatus. The power transmission control circuit 22 included in the power transmission control apparatus 20 performs various determination processes and, on the basis of the results of the determination processes, controls operations of the driver control circuit 26. Also, the driver control circuit 26 performs a process of determining data transmitted from the power reception apparatus. The power transmission unit (power transmission driver) 12 ac-drives the primary coil L1 on the basis of a drive clock DRCK of the primary coil (hereafter referred to as a "drive clock" or may be referred to as a "driver clock"). The power transmission apparatus communicates with the power reception apparatus by modulating the frequency (changing the frequency of a drive clock in the range between f1 and f2).

On the other hand, the power reception apparatus includes the secondary coil L2, a capacitor C2, a power reception unit 42, a load modulation unit 46, a frequency detection circuit 60, and a power reception control circuit 52. The frequency detection circuit 60 includes a drive clock (DRCK) regeneration unit 61. The power reception apparatus communicates with the power transmission apparatus by performing load modulation (forcefully changing the load state of the power reception apparatus).

The power reception unit 42 divides the coil end voltage of the secondary coil using voltage dividing resistances RB1 and RB2. A sinusoidal wave having a frequency identical to the frequency of a drive clock DRCK is obtained from the common contact of the voltage dividing resistances RB1 and RB2. This sinusoidal wave is shaped by the DRCK reproduction unit 61 so that the drive clock is regenerated. In FIG. 2A, the regenerated drive clock is represented by DRCK (RE).

The power reception control circuit 52 turns on or off a load modulation transistor (NMOS transistor) TB3 of the load modulation unit 46 in synchronization with an edge timing of the regenerated drive clock DRCK (RE). When the load modulation transistor TB3 is turned on, a current is passed through a resistance RB3 and load modulation transistor TB3 so that the load state of the power reception apparatus becomes heavy. When the load modulation transistor TB3 is turned off, a current is shut off so that the load state of the power reception apparatus becomes light.

As shown in the lower part of FIG. 2A, when the load state of the power reception apparatus is changed from a low load state to a high load state, for example, the voltage amplitude of a coil end voltage CSG of the primary coil is increased. The waveform monitor circuit 14 detects the load state of the power reception apparatus by comparing the coil end voltage CSG of the primary coil with a threshold voltage Vth. For example, if the low load state of the power reception apparatus is associated with data "0" and the high load state thereof is associated with data "1", it is determined whether received data is "0" or "1". Note that instead of the detection method of detecting the peak voltage of the coil end, a detection method where attention is focused on the phase difference between a voltage and a current may be used.

A problem caused when the power transmission control apparatus 20 determines whether received data is "0" or "1" is the existence of a data-undetermined period. A data-undetermined period corresponding to m (m is an integer equal to or larger than 1) drive clocks of the primary coil exists from the timing when the load state of the power reception apparatus is changed due to the modulation of the load of the power reception apparatus to the time when the power transmission apparatus stably detects the change in the load state of the power reception apparatus.

For example, in FIG. 2B, the state of the load modulation transistor TB3 in the power reception apparatus is changed from ON to OFF at a time t1. However, the amplitude of the coil end voltage CSG of the primary coil L1 is gradually increased over a period from the time t1 to a time t6. The coil end voltage is stabilized at the time t6 and later. As a result, highly reliable data determination is performed. The period from the time t1 to the time t6 is a period over which data is undetermined. A description "xxxxx" in FIG. 2B indicates that 5 pieces of data obtained in a period corresponding to 5 drive clocks are undetermined. Received data is stabilized at the time t6 and later so that the power transmission control apparatus 20 can correctly determine that each received data is "1".

While it is conceivable that a data-undetermined period corresponding to one or more drive clocks of the primary coil generally exists, it cannot be said that there is no case where a change in data transmitted due to the load modulation performed by the power reception apparatus thereof is rapidly transmitted to the power transmission apparatus so that a communication delay becomes shorter than one drive clock cycle of the primary coil (in this case, there is substantially no data-undetermined period).

During the data-undetermined period (from the time t1 to the time t6), a signal (coil end signal) obtained from the coil end of the primary coil is unstable and is not highly reliable. Therefore, if whether received data is "0" or "1" is determined on the basis of only received data obtained during a data-undetermined period, there is a high possibility that an erroneous determination is made. Therefore, there is a need to adopt a novel data determination method. For this reason, this embodiment adopts an n-times continuous matching determination method (to be described later).

Transmission and Reception of Periodical Authentication Data and Communication Packet.

Figure 3A:
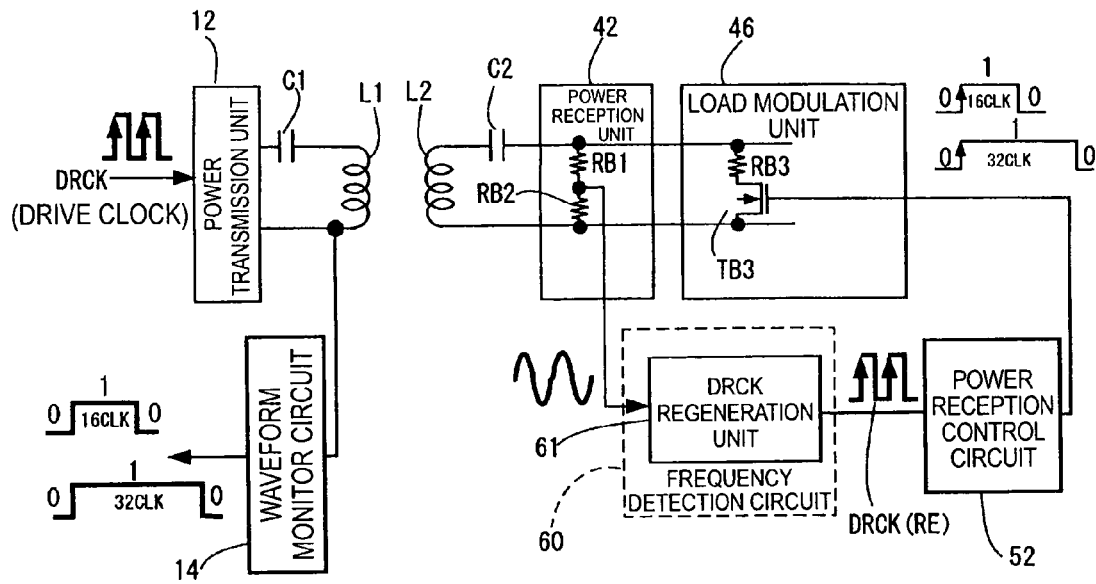
FIGS. 3A to 3D are drawing showing transmission and reception of periodic authentication data and a communication packet.
Figure 3B:
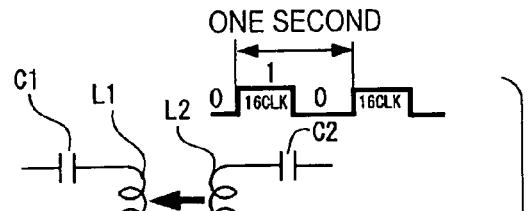
Figure 3C:
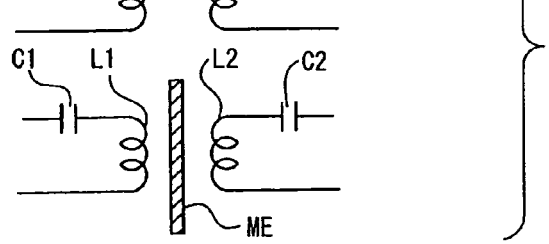
Figure 3D:
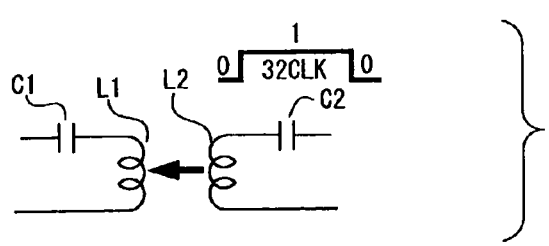

FIGS. 3A and 3D are drawings showing transmission and reception of periodical authentication data and a communication packet.

As described above, the power reception apparatus modulates the load thereof during normal power transmission so as to transmit a communication packet to the power transmission apparatus. Also, the power reception apparatus transmits periodic authentication data having a predetermined pattern periodically (e.g., every second). Periodic authentication is performed to detect a so-called "takeover state".

The power transmission control apparatus must receive data transmitted from the power reception apparatus while determining whether the data is periodic authentication data or a communication packet. For this reason, a difference is made between the length of one bit of periodic authentication data and that of a communication packet.

First, periodic authentication will be described. As shown in FIGS. 3B and 3C, if the power transmission apparatus starts normal power transmission to the power reception apparatus and subsequently, for example, a plate-shaped conductive foreign object (metal foreign object) ME having a large area is inserted between the primary coil L1 and secondary coil L2, the transmitted power is continuously consumed by the metal foreign object ME. Therefore, even after the power reception apparatus is taken off, the power transmission apparatus continues normal power transmission while determining that the power reception apparatus still exists as a load. This state is called a "takeover state." A takeover state may heat the metal foreign object ME to a high temperature, causing a burn, a machine break, or the like.

For this reason, the power reception apparatus performs a periodic authentication process (a process of modulating the load periodically), that is, transmits data having a predetermined pattern (for example, "0" "1" "0") to the power transmission apparatus at predetermined intervals (e.g., every second). In this case, a period over which "1" continues is set to a period corresponding to 16 drive clocks DRCK.

While a state where the load of the power reception apparatus is light is associated with "0" and a state where the load is heavy is associated with "1" in the above description, conversely, a state where the load is heavy may be associated with "0" and a state where the load is light may be associated with "1." In this case, the power reception apparatus transmits periodic authentication data "1" "0" "1" by modulating the load. Even if "0" is replaced with "1" and "1" is replaced with "0" in the above description, the operations of this embodiment are not affected at all and both types of periodic authentication data are equivalent to each other. This applies to all the description of this specification.

The power transmission control apparatus detects whether a takeover state has occurred, depending on whether it can detect periodic authentication data periodically transmitted from the power reception apparatus. That is, if a takeover state occurs, periodic authentication data transmitted from the power reception apparatus does not reach the power transmission apparatus. Thus, the power transmission control apparatus detects that the takeover state has occurred. Upon detection of the takeover state, the power transmission apparatus stops the normal power transmission.

Next, a communication packet will be described. As shown in FIG. 3D, one-bit data forming a communication packet continues over a period corresponding to 32 drive clocks DRCK. That is, in an example of FIG. 3D, the length of one bit is twice the bit length of periodic authentication data.

As shown in FIG. 3A, the power transmission control apparatus detects a change in the waveform of received data obtained from the waveform monitor circuit 14. If the power transmission control apparatus continuously detects an identical level even after a period corresponding to 16 drive clocks DRCK has elapsed from the first detection of a waveform change, it determines that the received data is a communication packet. Also, if the level of the received data is inverted after a period corresponding to 16 drive clocks has elapsed, the power transmission control apparatus determines that the received data is periodic authentication data. In this way, the power transmission control apparatus detects periodic authentication data and a communication packet as distinguished from each other.

However, as described above, there exists a data-undetermined period. Therefore, in order to reliably determine whether received data is "1" or "0", a novel data determination method is required.

N-Times Continuous Matching Determination

For this reason, this embodiment adopts a data determination method (n-times continuous matching determination method) where if data is detected at every drive clock cycle of the primary coil and an identical value is detected n-times ($n=m+\alpha \leq p$, where $\alpha$ is an integer equal to or larger than 1 and m is the number of drive clocks corresponding to a data-undetermined period) continuously, the detected value is adopted.

Here, assume that there exists a data-undetermined period corresponding to 5 drive clocks of the primary coil L1 (m=5).

Also, assume that a period over which one-bit data, "0" or "1", transmitted from the power reception apparatus to the power transmission apparatus continues is set to k-times (k is an integer equal to or larger than 1) a period corresponding to p (p is an integer equal to or larger than 2) drive clocks of the primary coil. According to the example of FIG. 3, one bit of periodic authentication data corresponds to 16 clocks, so P=16 and k=1. One bit of a communication packet corresponds to 32 clocks, so p=32 and k=2.

In this example, n is preferably set to 7 as described above. That is, if an identical value is detected seven times continuously (n=7(<16), $\alpha$=2), the identical value is determined.

For example, assume that the power transmission control apparatus has determined received data as "1" seven times continuously. That is, assume that "1" "1" "1" "1" "1" "1" "1" have been detected. In this case, the first five "1" "1" "1" "1" "1" may be less reliable determination results on the basis of data obtained in a data-undetermined period. However, the subsequent two "1" "1" are determination results on the basis of highly reliable data. If an identical value is detected sevens times continuously, it can be determined that there is a high possibility that the received data has been changed from "0" to "1".

The principle of the n-times continuous matching determination method is as follows. That is, if an identical value is detected n times ($n=m+\alpha \leq p$, where $\alpha$ is an integer equal to or larger than 1) continuously, the n pieces of received data that have served as the base of the determination include at least $\alpha$ pieces of highly reliable data and thus have acceptable reliability. If received data is significantly unstable, detected multiple values must include at least one different value. That is, if no different value appears and an identical value is detected n times continuously, it can be considered that the received pieces of data show at least a same tendency (for example, show that the voltage amplitudes of coil end signals tend to increase). Therefore, it can be considered that the n times continuously detected value is a probable value.

Therefore, by using n-times continuous matching determination, highly reliable data determination is performed regardless of whether there exists a data-undetermined period. A period over which one-bit data continues is a period corresponding to p drive clocks of the primary coil, so the number of pieces of data usable in a one-bit data determination process (n-times continuous matching determination process) does not exceed the p. This is represented by $n \leq p$.

As the value of n (value of $\alpha$) is increased, the reliability of a data determination result is improved. On the other hand, the time required to determine a data value is increased. Therefore, the value of n (value of $\alpha$) is preferably determined in consideration of both the reliability of data determinations and the processing time. That is, if there exists a data-undetermined period corresponding to 5 drive clocks, the value of n used when n ($=m+\alpha$) continuous matching determination is performed is preferably set to a proper value in comprehensive consideration of the reliability of data determinations, a reduction in the determination processing time, the length of a period over which one-bit data continues (that is, the value of p (in this embodiment, p=16), and the like.

Hereafter, a concrete examination will be made. Assume that there exists a data-undetermined period corresponding to 5 clocks. Since the data-undetermined period may slightly vary, n=6 (therefore, $\alpha$=1) is not sufficient to ensure the reliability of data determinations. If n=7 (therefore, $\alpha$=2), there is an allowance of two clocks in addition to the undetermined period (5 clocks). Even if the undetermined period varies and thus becomes a period corresponding to 6 clocks, there is still an allowance of 1 clock. That is, even in the worst case, the determined pieces of data include highly reliable data.

Also, if the value of n is further increased like n=8, n=9, ..., etc., the reliability of data determinations made by performing n-times continuous matching determinations is increased. However, this disadvantageously increases the processing time required to determine data and complicates the determination circuit. Also, if one bit corresponds to 16 clocks, it is preferable to complete an n-time continuous determination within a period corresponding to 16 clocks during which the one bit continues (otherwise, data may be determined in a subsequent data-undetermined period and thus the reliability of data determinations is reduced). Considering this, the n value has an upper limit.

For the above-mentioned reasons, in this embodiment, when m=5 and p=16, n is set to 7. The value of n is optimized in comprehensive consideration of the reliability of data determinations, a reduction in the determination processing time, the length of a period over which one-bit data continues, and the like. Thus, a highly reliable data determination is performed without putting excess load on the data determination circuit included in the power transmission apparatus and without complicating a data determination process. Note that the n-times continuous matching determination is not limited to the above-mentioned example.

Detection of Periodic Authentication Data Using N-Times Continuous Matching Determination By using the n-times continuous matching determination method, the power transmission control apparatus reliably detects periodic authentication data transmitted from the power reception apparatus. Hereafter, this will be described more specifically. In the following description, it is assumed that a data-undetermined period corresponding to 5 drive clocks of the primary coil exists (m=5) and that one-bit data continues over a period corresponding to 16 drive clocks of the primary coil (that is, p=16, k=1). Also, it is assumed that if an identical value is detected seven times continuously (n=7(<16), α=2), the identical value is determined.

Figure 4:
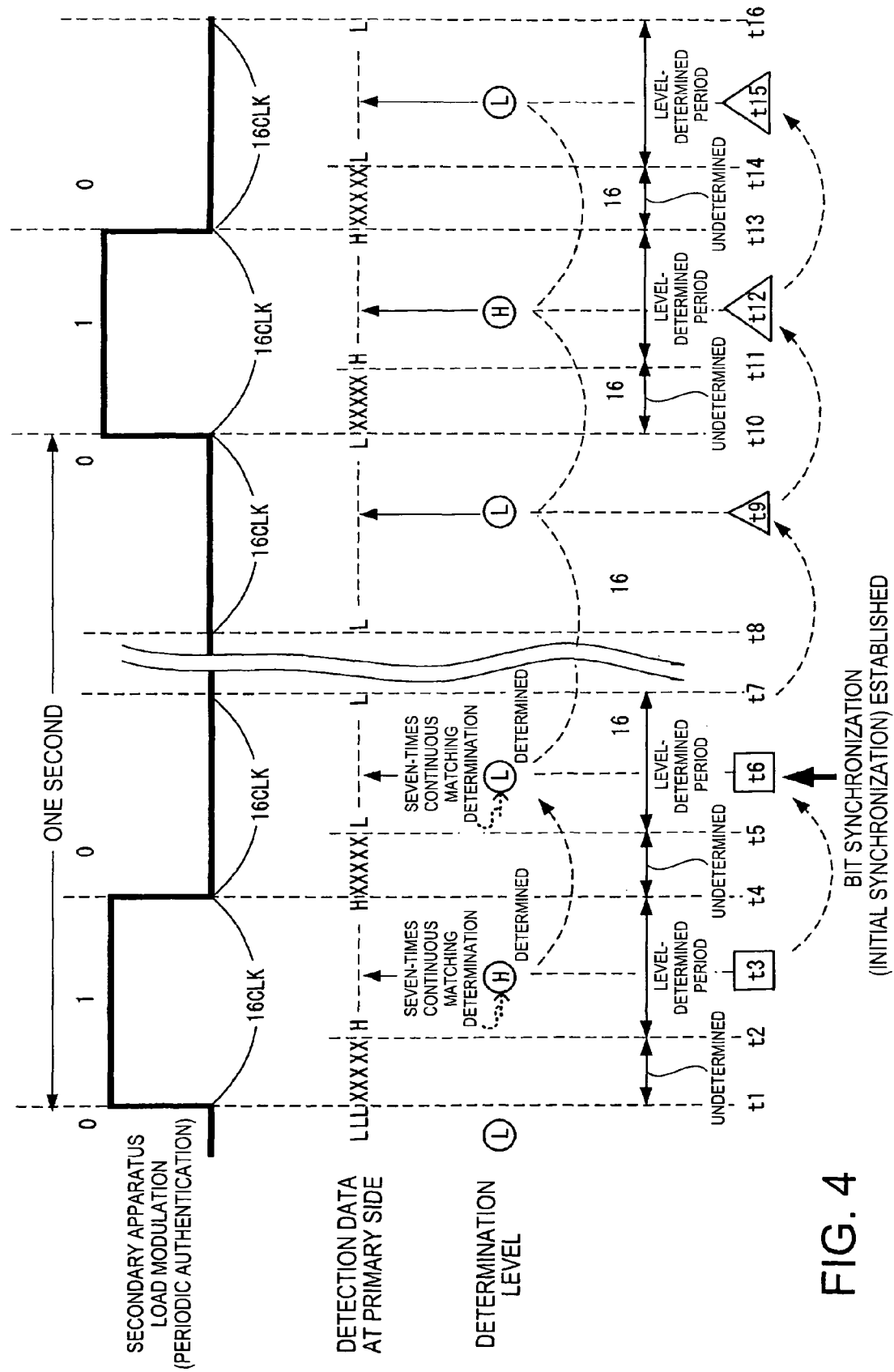
FIG. 4 is a drawing showing a periodic authentication data detection process using seven times continuous matching determination.

FIG. 4 is a drawing showing a periodic authentication data detection process using seven times continuous matching determination. As shown in FIG. 4, the power reception apparatus transmits periodic authentication data to the power transmission apparatus by performing load modulation at predetermined intervals (e.g., every second). The periodic authentication data has a pattern of "0" "1" "0" and a period over which "1" continues is a period corresponding to 16 drive clocks.

The power transmission control apparatus 20 included in the power transmission apparatus (primary apparatus) determines whether the received data is "0" or "1", on the basis of the coil end voltage of the primary coil. In FIG. 4, the value of received data is changed at times t1, t4, t10, and t13. A time t1-to-time t2 period, a time t4-to-time t5 period, a time t10-to-time t11 period, and a time t13-to-time t4 period are each a data-undetermined period corresponding to 5 clocks. Five pieces of data in each data-undetermined period are described as "xxxxx." The five pieces of data may be each determined as "0" or "1." Each data-undetermined period is a period over which data is gradually changed. If the value of received data is determined during a data-undetermined period, an erroneous determination may be made. Therefore, the value of data received in a period other than a data-undetermined period (that is, a level-determined period) is determined. A time t2-to-time t4 period, a time t5-to-time t7 period, a time t11-to-time t13 period, and a time t14-to-time t16 period are level-determined periods.

As described above, the power reception apparatus transmits "0" "1" "0" by modulating the load thereof. The power transmission control apparatus determines "H (=1)" at a time t3 by performing seven times continuous matching determinations and detects that the received data has been changed from "0" to "1".

If the received data is periodic authentication data, "1" must continues over a period corresponding to 16 drive clocks and then must be changed to "0". Therefore, if the power transmission apparatus detects the change from "0" to "1", it detects a change from "1" to "0" that subsequently occurs, by performing seven times continuous matching determinations. That is, after detecting "1" by performing seven times continuous matching determinations, seven times continuous matching determinations are again performed in a subsequent level-determined period (a time t5-to-time t7 period). As a result, "L (=0)" is determined at the time t6. This means that the first periodic authentication data has been detected, that is, means that bit synchronization (initial synchronization) has been established at the time t6.

Thereafter, received data is determined using a normal determination method (for example, a determination method of comparing the peak voltage of the coil end voltage with a threshold thereof rather than the seven times continuous matching determination method. Specifically, the value of data is determined at times t9, t12, and t15. These determinations are performed in level-determined periods while avoiding data-undetermined periods.

The power transmission control apparatus may always detect periodic authentication data by performing n-times continuous matching determinations. However, if the n-times continuous matching determination is performed every time, the time required for a determination process is increased and the processing load put on the determination circuit is increased. Also, if the first periodic authentication data is correctly detected, it is sufficient to determine whether received data is "0" or "1", every p (e.g., 16) drive clocks thereafter. Thus, data determination (data sampling) is performed without reducing the determination accuracy while avoiding data-undetermined period.

That is, only when first periodic authentication data is received, the n-times continuous matching determination is performed. After the first periodic authentication data is detected, whether received data is "0" or "1" is determined every period corresponding to p (e.g., 16) drive clocks using the detection timing (for example, the timing when "0" has been determined). This reduces the processing load put on the power transmission apparatus, as well as speeds up the periodic authentication data detection process.

The above-mentioned operations are summarized as follows. That is, assuming that the load state of the power reception apparatus has been changed from "0" to "1" to "0", an undetermined period corresponding to m clocks exists in the course of the change from "0" to "1". Similarly, an undetermined period corresponding to m (=5) clocks exists in the course of the change from "1" to "0". This undetermined period corresponding to m (=5) clocks is an obstacle to detecting the change from "1" to "0". However, it is already known that a period over which "1" continues is a period corresponding to p (=16) clocks. Therefore, a period over which the second undetermined period occurs can be predicted by using the timing when the first "1" has been detected, as the start point. Therefore, a timing when seven times continuous matching determinations are started to detect "0" after detecting "1" is set in a period subsequent to the completion of the second undetermined period.

That is, the power reception apparatus modules the load thereof at the time t1 to change transmission data from "0" to "1". Here, assume that one cycle of a drive clock DRCK (is also a reference clock for n-times continuous matching determination) of the primary coil L1 is t. "1" continues staring from the time t1 over a period corresponding to p (=16) drive clocks. Subsequently, the power reception apparatus changes transmission data from "1" to "0" at the time t4 (=t1+p·t). The time (t1+p·t) represents a time (that is, time t4) when a period corresponding to p clocks has elapsed from the time t1.

Subsequently, a data-undetermined period corresponding to m (=5) clocks exists (from the time t4 to the time t5). The data-undetermined period (second data-undetermined period) ends at the time t5 (t1+p·t+m·t). The time (t1+p·t+m·t) represents a time (that is, time t5) when a period corresponding to m clocks has elapsed from the time (t1+p·t).

Also, "0" must continue from the t4 (=t1+p·t) to a time (that is, time t7 (=t1+2·p·t), in other words, a time when the period corresponding to 32 clocks has elapsed from the time t1) when a period corresponding to at least p (=16) clocks has elapsed. Therefore, if the n-times (here, n=7) continuous matching determination is performed within a period from the time (t1+p·t+m·t) to the time (t1+2·p·t), "0" can be determined on the basis of only highly reliable data while avoiding the second data-undetermined period.

That is, the power transmission control apparatus detects the change from "0" to "1" of received data. Subsequently the power transmission apparatus detects data at every drive clock cycle of the primary coil in a period after a period corresponding to (p+m) drive clocks of the primary coil has elapsed from the time t1 and before a period corresponding to (2×p) drive clocks of the primary coil elapses from the time t1. As a result, if "0" is detected n-times continuously, the detected "0" is determined. Thus, the power transmission control apparatus reliably detects the change from "1" to "0" of received data and correctly detects that the received data is periodic authentication data.

In the above-mentioned description, a state in which the load of the power reception apparatus is light is associated with "0" and a state in which the load of the power reception apparatus is heavy is associated with "1". However, as described above, a state in which the load of the power reception apparatus is heavy may be associated with "0" and a state in which the load of the power reception apparatus is light may be associated with "1". In this case, the power reception apparatus transmits periodic authentication data "1" "0" "1" by modulating the load thereof. Even if "0" is replaced with "1" and "1" is replaced with "0" in the above-mentioned description, the operations of this embodiment are note affected at all and both types of periodic authentication data are equivalent to each other. This applies all the description in this specification.

Figure 5:
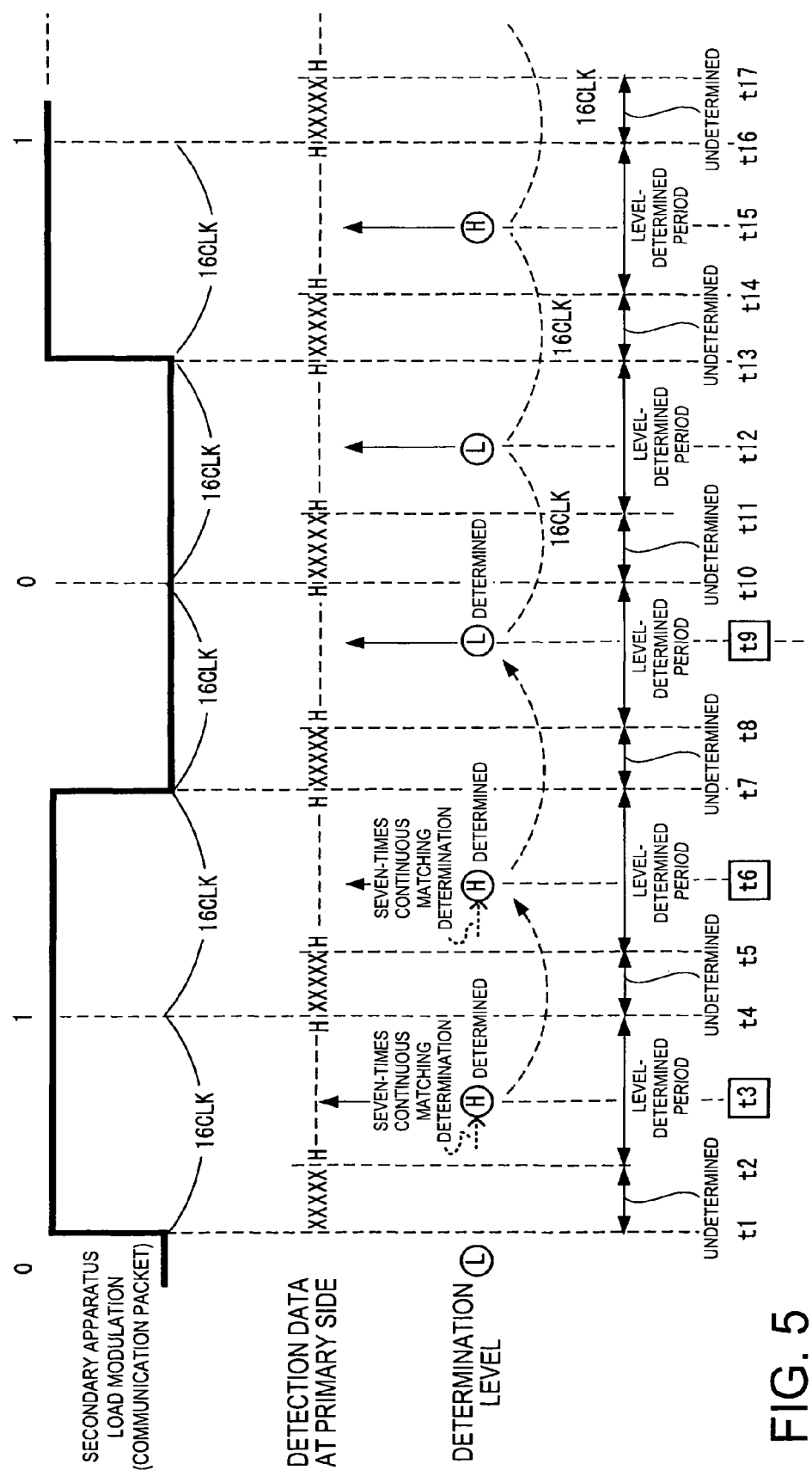
FIG. 5 is a drawing showing communication packet detection using n-times continuous matching determination.

Detection of Communication Packet Using N-Times Continuous Matching Determination FIG. 5 is a drawing showing communication packet detection using n-times continuous matching determination. The power transmission control apparatus detects a communication packet transmitted from the power reception apparatus using n-times continuous matching determination. A process for detecting a communication packet is similar to periodic authentication data detection process. For periodic authentication data, "1" continues over a period corresponding to p clocks (for example, 16 clocks); for a communication packet, "1" continues over a period corresponding to q (=β×p; if β=2, q=32) clocks. Using this difference, the power transmission control apparatus detects periodic authentication data and a communication packet as distinguished from each other.

In FIG. 5, the power transmission control apparatus first determines "H (=1)" by performing n-times continuous matching determinations (time t3) and thus detects a change from "0" to "1". Subsequently, the power transmission control apparatus detects data at every drive clock DRCK cycle of the primary coil in a period (that is, a time t5-to-time t7 period) after a period corresponding to (p+m) drive clocks of the primary coil has elapsed and before a period corresponding to (2×p) drive clocks of the primary coil elapses. If "H (=1)" is detected seven times continuously, the power transmission control apparatus determines "1" and thus detects a change from "1" to "1" (time t6).

As seen above, assuming that p=16 and q=32 and that detection is performed using 16 clocks as one unit, as for periodic authentication data, "0" "1" "0" are detected. On the other hand, as for a communication packet, "0" "1" "1" are detected. In this case, "1" is detected twice continuously. Therefore, it is determined that the received data is a communication packet. Also, when the n-times continuous matching determination is performed at a timing (that is, time t6) when an undetermined period is avoided, the second "1" is determined. That is, data is determined on the basis of only highly reliable data. As a result, the determination accuracy is improved.

After "1" is determined at the time t6, whether received data is "0" or "1" is determined at every cycle (one cycle corresponds to p (=16) drive clocks of the primary coil) from the timing (time t6) when the "1" has been determined or from a subsequent determination timing (time t9 in FIG. 5) determined on the basis of the timing (t6) when the "1" has been determined. That is, data is determined every 16 clocks from the time t6 (not adopted in FIG. 5). Also, as described in FIG. 5, a time t9 may be determined using the time t6 as the start point, and after "0" is determined at the time t9, data may be determined every 16 clocks (time t12, time t15). In FIG. 5, the time t9 is a timing when a period corresponding to 16 drive clocks has elapsed from the time t6. In FIG. 5, in order to determine data at more proper timings, a time (time t9) when a period corresponding to 16 clocks has elapsed from the time t6 is specified and the time t9 is used as the start point for periodic data determinations.

If the n-times continuous matching determination is performed every time in order to determine data of a communication packet, the time required for the determination process is increased and the processing load put on the determination circuit is increased. For this reason, after the first communication packet is correctly detected (time t9), whether received data is "0" or "1" is determined, for example, every p (e.g., 16) drive clocks (time t12, time t15). This is because when the first communication packet is correctly detected (time t9), proper timings for receiving a communication packet are found and bit synchronization (initial synchronization) is established. In this case, data determination (data sampling) is performed without reducing the determination accuracy while avoiding data-undetermined periods.

That is, only when receiving the first data, the power transmission control apparatus performs the n-times continuous matching determination. After detecting the first communication packet, the power transmission control apparatus determines whether received data is "0" or "1", at every cycle (one cycle corresponds to p (e.g., 16) drive clocks) using the detection timing (for example, the timing (time t6) when the second "1" has been determined) or a subsequent timing (time t9) determined on the basis of the timing when the second "1" has been determined (time t12, time t15). This reduces the processing load put on the power transmission control apparatus, as well as speeds up the communication packet detection process.

Figure 6:
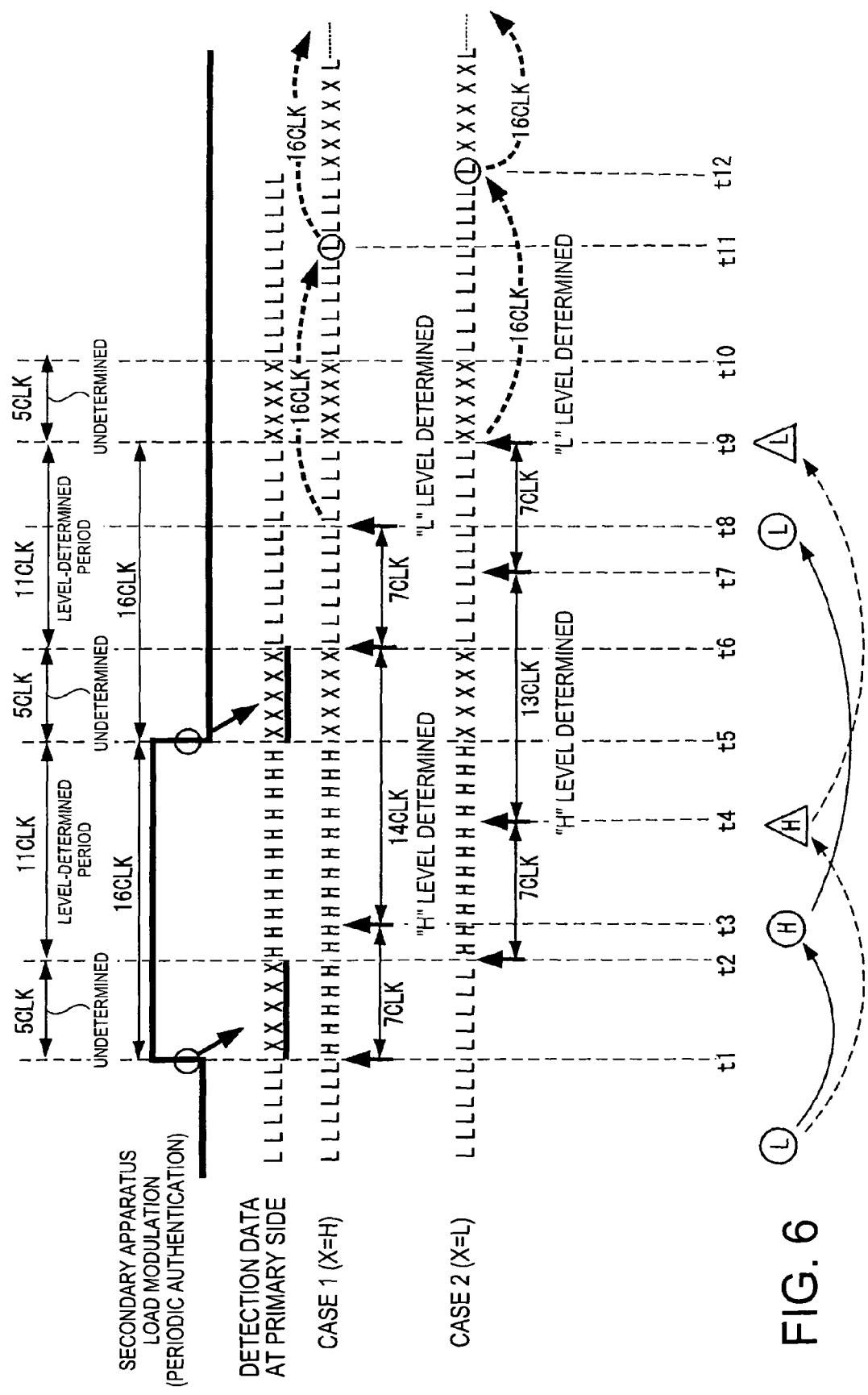
FIG. 6 is a drawing showing a specific example of periodic authentication data detection using n-times continuous matching determination.

Specific Example of Periodic Authentication Data Detection Using N-Times Continuous Matching Determination FIG. 6 is a drawing showing a specific example of periodic authentication data detection using the n-times continuous matching determination. Five pieces of data "xxxxx" in a data-undetermined period may be each determined as "L (=0)" or "H (=1)." Therefore, an actual timing when the n-times continuous matching determination is performed must be determined in consideration of a case (case 1) where the five pieces of data in the data-undetermined period are all determined as "H (=1)" and a case (case 2) where the five pieces of data are all determined as "L (=0)". If data is correctly determined even in the cases 1 and 2, which are extreme reception examples, a correct determination can be made in any reception aspect. As described above, if a data-undetermined period corresponding to 5 clocks exists, one bit of a communication packet has a bit length corresponding to 32 clocks and one bit of periodic authentication data has a bit length corresponding to 16 clocks.

First, the case 1 (case where pieces of data in a data-undetermined period are all determined as 1) will be examined. At the time t1, the power transmission control apparatus first detects a change from "L (=0)" to "H (=1)". Then, in a period from the time t6 to the time t9, the power transmission control apparatus can stably detects a subsequent change from "H (=1)" to "L (=0)". An interval between the time t1 and the time t6 is a period corresponding to 21 clocks (=16+5).

Next, the case 2 (case where pieces of data in a data-undetermined period are all determined as 0) will be examined. At the time 2, the power transmission control apparatus first detects a change from "L (=0)" to "H (=1)". Then, in a period from the time t6 to the time t9, the power transmission control apparatus can stably detect a subsequent change from "H (=1)" to "L (=0)". Since a data-undetermined period may occur again at the time t9 and later, the power transmission control apparatus must determine data at the time t9 or earlier. In this case, an interval between the time t2 and the time t9 is a period corresponding to 27 clocks (=16+16−5). That is, the n-times continuous matching determination must be performed twice in this period corresponding to 27 clocks.

If too large a value is set for n, the n-times continuous matching determination cannot be performed twice in the case 2. On the other hand, if too small a value is set for n (for example, n=5), the reliability of data determinations is reduced. For example, if n=5, the reliability of data determinations is reduced because five pieces of data in a data-undetermined period may be used as the bases for five times continuous matching determination. Even if n=6, sufficient reliability is not ensured because a data-undetermined period may vary.

Therefore, the power transmission control apparatus preferably performs a first determination process considering the case 1 and a second determination process considering the case 2 in parallel. Also, it is preferable to reduce the difference between the first determination process and the second determination process as much as possible in order to simplify the configuration of the determination circuit. Comprehensively considering these points, it is most preferable to set 7 for n.

FIG. 6 shows an example of an optimal determination timing in a case where seven times continuous matching determination is performed. That is, in the case 1, the power transmission control apparatus performs the first seven times continuous matching determinations over a time t1-to-time t3 period. Then, the power transmission control apparatus waits until a period corresponding to 14 clocks elapses from the time t3. Then, the power transmission control apparatus performs the second seven times continuous matching determinations over a time t6-to-time t8 period.

In the case 2, the power transmission control apparatus performs the first seven times continuous matching determinations over a time t2-to-time t4 period. Then, the power transmission control apparatus waits until a period corresponding to 13 clocks elapses from the time t4. Then, the power transmission control apparatus performs the second seven times continuous matching determinations over a time t7-to-time t9 period.

In the case 1, the power transmission control apparatus performs the first seven times continuous matching determinations over the time t1-to-time t3 period. As a result, the power transmission control apparatus determines "H (=1)" at the time t3. Subsequently, the power transmission control apparatus waits until the time corresponding to 14 clocks elapses from the time t3. Then, the power transmission control apparatus performs the second seven times continuous matching determinations over the time t6-to-time t8 period. As a result, the power transmission control apparatus determines "L (=0)" at the time t8.

In the case 2, the power transmission control apparatus performs the first seven times continuous matching determinations over the time t2-to-time t4 period. As a result, the power transmission control apparatus determines "H (=1)" at the time t4. Subsequently, the power transmission control apparatus waits until the time corresponding to 13 clocks elapses from the time t4. Then, the power transmission control apparatus performs the second seven times continuous matching determinations over the time t7-to-time t8 period. As a result, the power transmission control apparatus determines "L (=0)" at the time t9.

In both the case 1 and case 2, the power transmission control apparatus reliably performs seven times continuous matching determinations. In particular, the power transmission control apparatus performs the second seven times continuous matching determinations while avoiding data-undetermined periods, thereby improving the reliability of data determinations.

Figure 7:
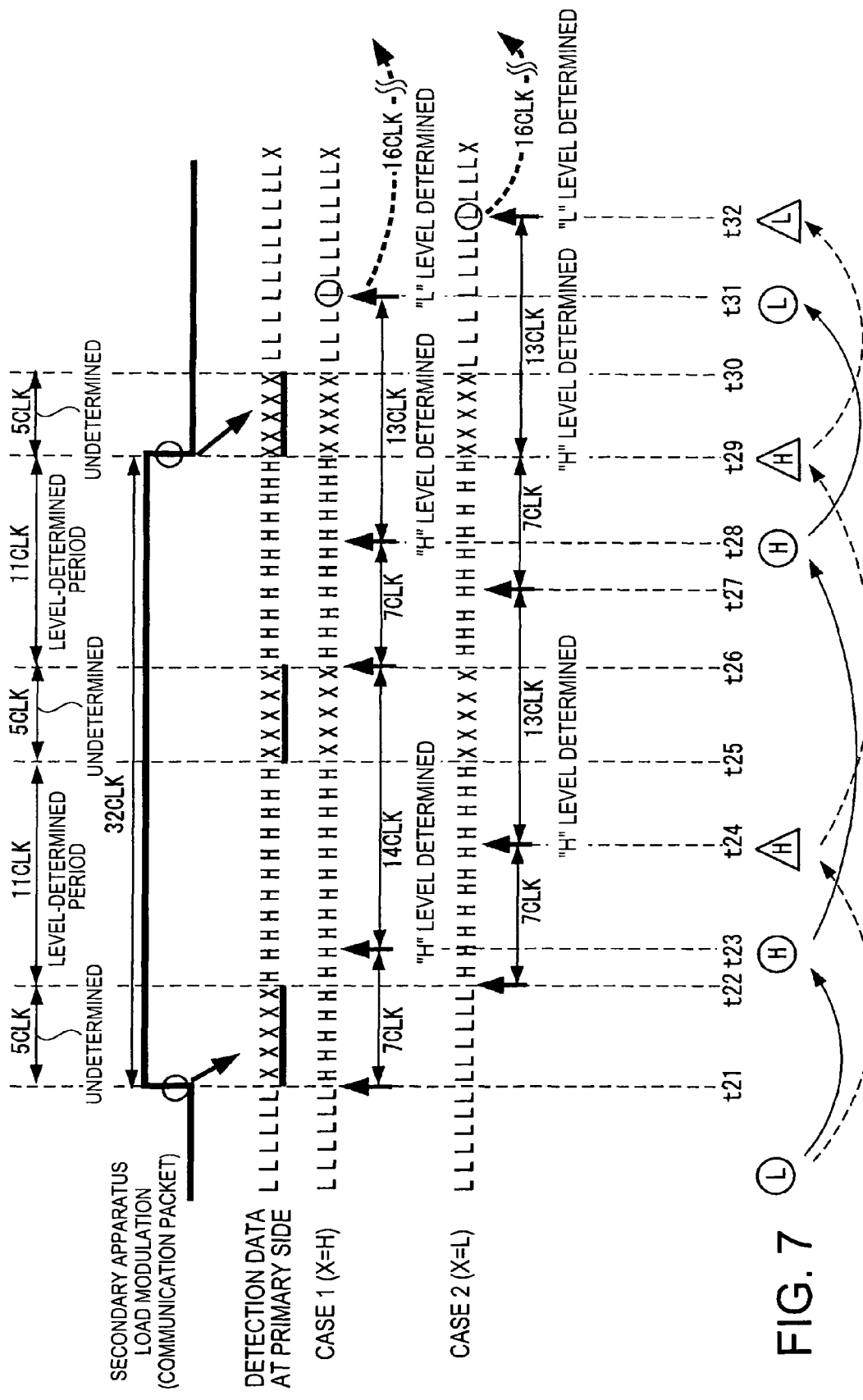
FIG. 7 is a drawing showing a specific example of communication packet detection using n-times continuous matching determination.

Specific Example of Communication Packet Detection Using N-Times Continuous Matching Determination FIG. 7 is a drawing showing a specific example of communication packet detection using n-times continuous matching determination. As with periodic authentication data, a timing when data of a communication packet is determined must be determined in consideration of the cases 1 and 2.

In the case 1, the power transmission control apparatus performs the first seven times continuous matching determinations over a time t21-to-time t23 period. As a result, the power transmission control apparatus determines "H (=1)" at the time t23. Subsequently, the power transmission control apparatus waits until a period corresponding to 14 clocks elapses from the time t23. Then, the power transmission control apparatus performs the second seven times continuous matching determinations over a time 26-to-time t28 period. As a result, the power transmission control apparatus determines "H (=1)" at the time t28. Subsequently, the power transmission control apparatus waits until a period corresponding to 13 clocks elapses from the time t28. Then, the power transmission control apparatus determines "L (=0)" at a time t31. Thereafter, the power transmission control apparatus determines data every 16 clocks.

In the case 2, the power transmission control apparatus performs the first seven times continuous matching determinations over a time t22-to-time t24 period. As a result, the power transmission control apparatus determines "H (=1)" at the time t24. Subsequently, the power transmission control apparatus waits until a period corresponding to 13 clocks elapses from the time t24. Then, the power transmission control apparatus performs the second seven times continuous matching determinations over a time 27-to-time t29 period. As a result, the power transmission control apparatus determines "H (=1)" at the time t29. Subsequently, the power transmission control apparatus waits until a period corresponding to 13 clocks elapses from the time t29. Then, the power transmission control apparatus determines "L (=0)" at a time t32. Thereafter, the power transmission control apparatus determines data every 16 clocks.

Example of Data Structure of Communication Packet

Figure 8:
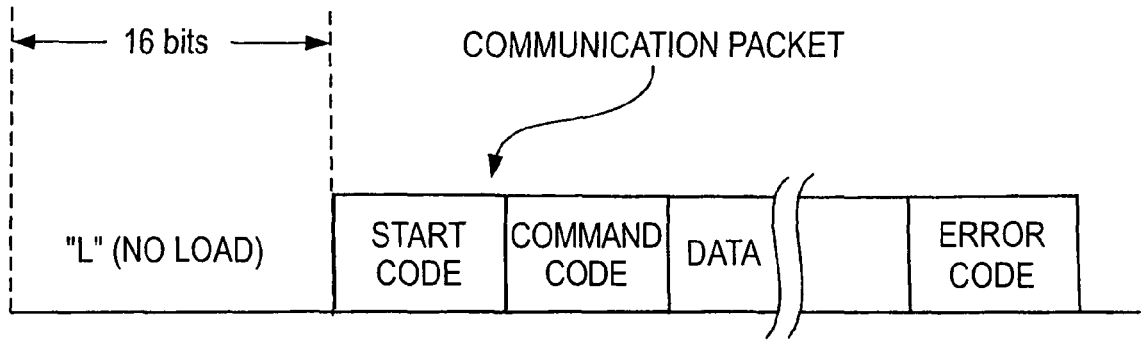
FIG. 8 is a drawing showing an example of a data structure of a communication packet.

FIG. 8 is a drawing showing an example of a data structure of a communication packet. A communication packet may include start code, command code, data (communication data), and error code. In order for the power transmission apparatus to easily detect the top of a communication packet, a 16-bit "L (=0)" period is provided immediately before the communication packet.

Example Configuration of Data Determination Circuit

Figure 9:
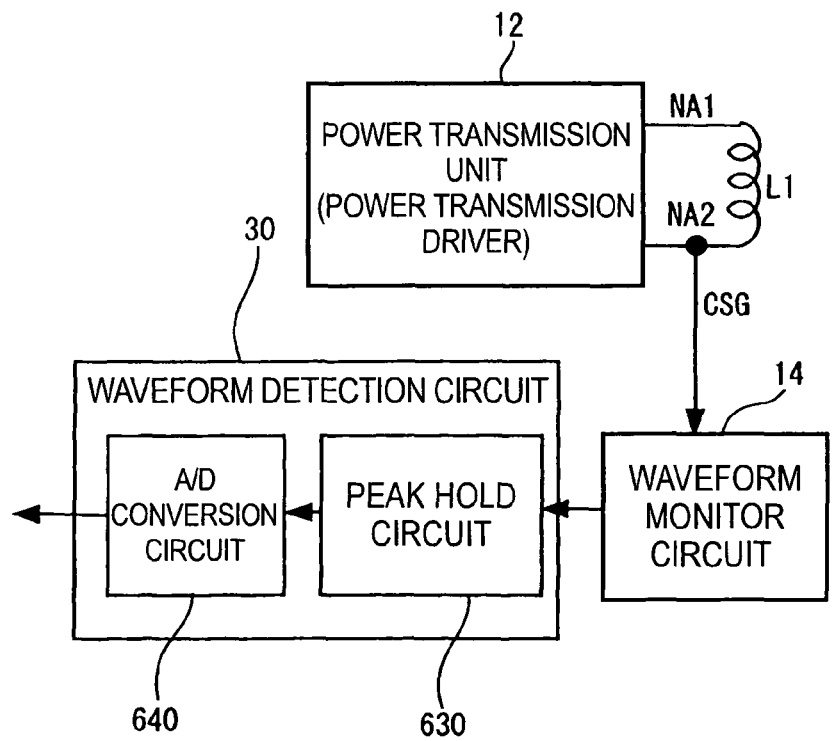
FIG. 9 is a drawing showing an example configuration of a data determination circuit (waveform detection circuit) in the power transmission apparatus.

FIG. 9 is a drawing showing an example configuration of a data determination circuit (waveform detection circuit) in the power transmission apparatus. A waveform detection circuit 30 includes a peak hold circuit 630 and an A/D conversion circuit 640. As shown in FIGS. 2A and 2B, when the load state of the power reception apparatus is changed, the amplitude of the coil end voltage of the primary coil L1 varies. Therefore, by sampling the coil end voltage using the peak hold circuit, A/D-converting the sampling value, and comparing the A/D-converted sampling value with a threshold Vth, whether received data is "0" or "1" is determined.

Figure 10A:
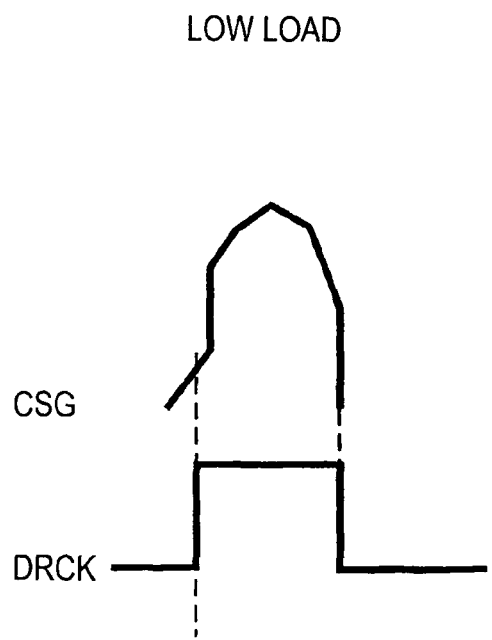
FIGS. 10A and 10B are drawings showing a pulse width detection method.
Figure 10B:
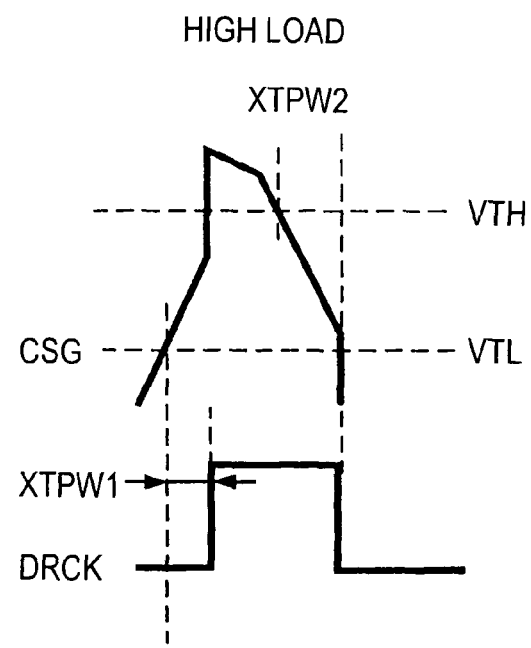

Also, a method (pulse width detection method) of determining data while focusing attention on the potential difference between a voltage and a current may be adopted. FIGS. 10A and 10B are drawings showing a pulse width detection method.

FIG. 10A shows an example of a signal waveform of the coil end voltage CSG in a case where the load of the power reception apparatus (secondary apparatus) is low (load current is small). FIG. 10B shows an example of a signal waveform of the coil end voltage CSG in a case where the load of the power reception apparatus is high (load current is large). As shown in FIGS. 10A and 10B, as the load of the power reception apparatus is increased, the waveform of the coil end voltage CSG is distorted to a larger extent.

More specifically, when the load is low as shown in FIG. 10A, a square wave having a drive waveform (waveform of DRCK) is more dominant than a sinusoidal wave having a coil resonant waveform. On the other hand, when the load becomes high as shown in FIG. 10B, a sinusoidal wave having a resonant waveform becomes more dominant than a square wave having a drive waveform, causing a distortion in waveform.

For this reason, as shown in FIG. 10B, by detecting a pulse width period XTPW1 when the coil end signal CSG rises, a variation in the load of the power reception apparatus may be detected. Also, by detecting a pulse width period XTPW2 when the coil end signal CSG falls, a variation in the load of the power reception apparatus may be detected. That is, by detecting that the waveform of the coil end signal CSG is changed from a signal waveform less dominant than a square wave to a more dominant sinusoidal signal waveform, a load variation is detected.

Example Configuration of Power Transmission Apparatus

FIG. 11 is a drawing showing an example configuration of the power transmission apparatus. The power transmission apparatus includes an oscillation circuit 24, a driver control circuit 26, a power transmission unit (power transmission driver) 12, the primary coil L1, the waveform monitor circuit 14, the waveform detection circuit 30, and the power transmission control circuit 22. The waveform detection circuit 30 and power transmission control circuit 22 are elements of the power transmission control apparatus (but not limited thereto). The waveform detection circuit 30 functions as a signal detection circuit for detecting a signal (here, coil end voltage) of the coil end of the primary coil L1. A signal detected by the signal detection circuit is provided to the power transmission control circuit 22. The power transmission control circuit 22 performs n-times continuous matching determinations (for example, seven times continuous matching determinations) on signals detected by the signal detection circuit so as to identify the values ("0" or "1") of pieces of data transmitted due to the load modulation performed by the power reception apparatus 40. Also, the power transmission control circuit 22 performs a determination, for example, using 16 clocks as one unit. If "010" is detected, the power transmission control circuit 22 determines that the data is periodic authentication data for detecting a takeover state; if "011" is detected, it determines that the data is data of a communication packet.

The waveform detection circuit 30 includes a waveform shaping circuit 32, a counter 31, a pulse width detection circuit 33, a register 23, and a comparator 29. The waveform shaping circuit 32 shapes the waveform of a coil end signal outputted from the waveform monitor circuit 14. The pulse width detection circuit 33 measures the length (pulse width) of the XTPW1 (or XTPW2) shown in FIG. 10B using the drive clock DRCK (driver clock). The counter 31 is used to measure the pulse width. The measured pulse width is stored in the register 23. The comparator 29 receives thresholds (LEVL, LEVH, SIGH) used for various determinations. The comparator 29 compares a pulse width with a threshold and provides the comparison result to the power transmission control circuit 22. The power transmission control circuit 22 determines whether the received data is "0" or "1", on the basis of the comparison result.

Example Configuration of Contactless Power Transmission System

Figure 12:
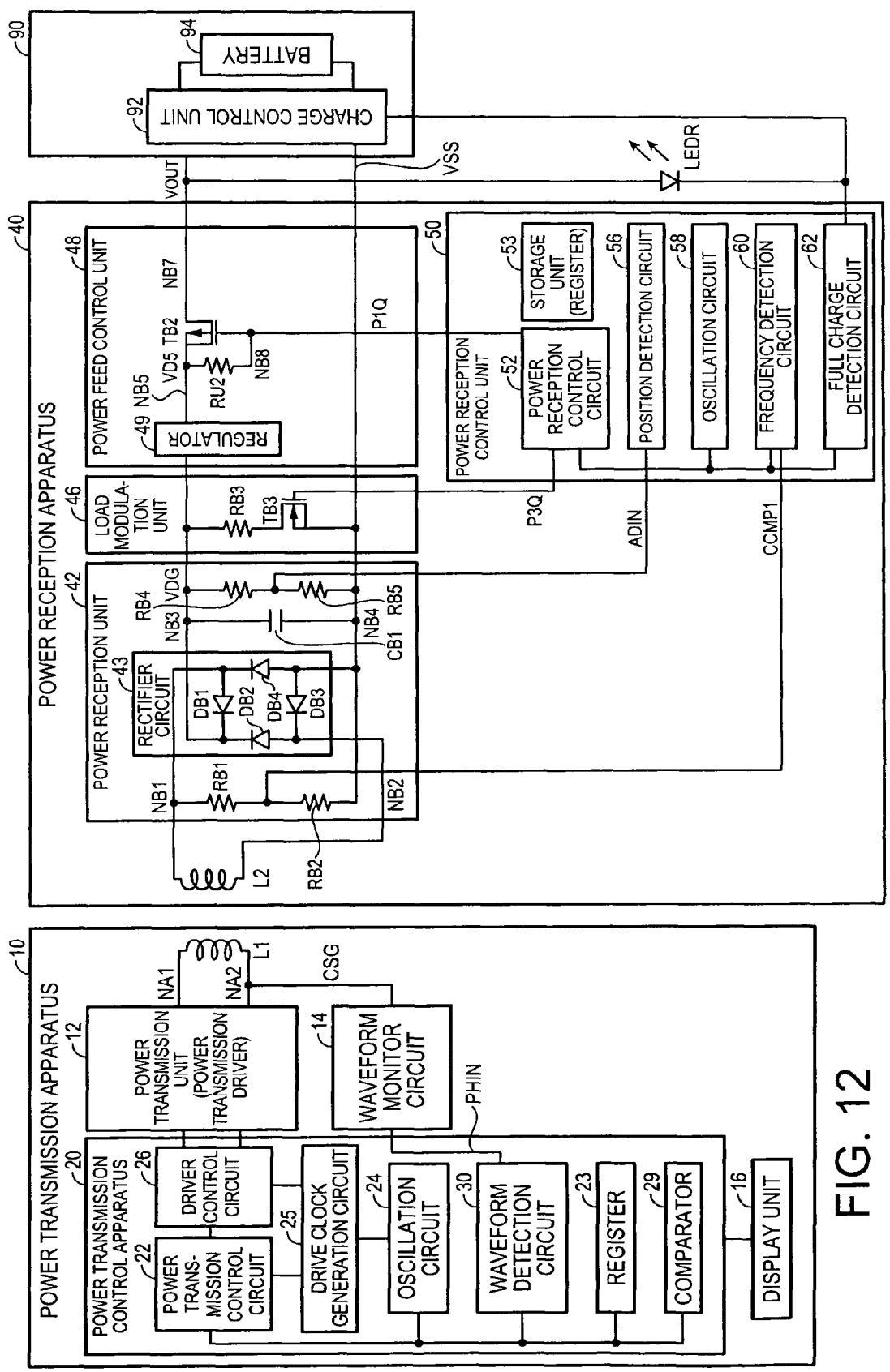
FIG. 12 is a drawing showing a configuration of the contactless power transmission system.

FIG. 12 is a drawing showing a configuration of a contactless power transmission system. The power transmission apparatus 10 includes the power transmission control apparatus (power transmission control IC) 20, a power transmission unit (power transmission driver) 12, the primary coil L1, the waveform monitor circuit 14, and a display unit 16. The power transmission control apparatus (power transmission control IC) 20 includes the power transmission control circuit 22, the oscillation circuit 24, the driver control circuit 26, a drive clock generation circuit 25, and the comparator 29.

The power reception apparatus 40 includes the power reception unit 42, load modulation unit 46, a power feed control unit 48, and a load 90 (including a charge control apparatus 92 and a battery 94), which is the subject of power feeding. The power reception unit 42 includes a rectifier circuit 43. The load modulation unit 46 includes a load modulation transistor TB3. The power feed control unit 48 includes a regulator 4 and a power feed control transistor TB2. A power reception control apparatus (power reception control IC) 50 includes a power reception control circuit 52, a storage unit 53, a position detection circuit 56, an oscillation circuit 58, a frequency detection circuit 60 (including a DRCK regeneration unit 61), and a full charge detection circuit 62. An LEDR is a light-emitting diode for displaying the charge state of the battery 94.

Example Operations of Contactless Power Transmission System

FIG. 13 is a drawing showing example operations of the contactless power transmission system. The power transmission apparatus detects whether the power reception apparatus is set, for example, once every 0.3 sec. (step S1). Then, the power transmission detects that the power reception apparatus is set (step S2).

Subsequently, the power transmission apparatus and power reception apparatus exchange various types of information with each other (step S3). For example, the power transmission apparatus detects information transmitted from the power reception apparatus with high accuracy by performing seven times continuous matching determinations. After confirming that the power reception apparatus is a proper power transmission subject by performing ID authentication, the power transmission apparatus starts normal power transmission (charge).

When detecting a full charge during the normal power transmission, the power reception apparatus transmits full charge notification to the power transmission apparatus. Upon receipt of the notification, the power transmission apparatus stops the normal power transmission (step S4). Then, the power transmission apparatus moves to a post-full-charge-detection standby phase (step S5).

In the post-full-charge-detection standby phase, the power transmission apparatus detects whether the power reception apparatus has been taken off, once every 5 sec. Also, the power transmission apparatus checks whether recharge of the power reception apparatus is needed, once every 10 min. When the power reception apparatus is taken off after charged fully, the power transmission apparatus returns to the initial standby phase (step S6). Also, if the power transmission apparatus determines that the power reception apparatus needs to be recharged after charged fully, it returns to step S3 (step S7). Also, if the power transmission apparatus detects in step S3 that the power reception apparatus has been taken off, it returns to the initial standby phase (step S8).

As described above, by adopting the embodiment of the invention, the power transmission apparatus of the contactless power transmission system reliably and rapidly performs a bit synchronization (initial synchronization) process, a first-received periodic authentication data determination process, and the like.

Also, for example, the data determination process circuit is simplified. Also, for example, the power transmission apparatus receives a communication packet and periodic authentication data transmitted from the power reception apparatus, as distinguished from each other.

Also, a high-performance power transmission apparatus and a high-performance contactless power transmission system that both perform a communication process highly reliably and rapidly and are simplified in circuit configuration are obtained. While the embodiment has been described, it will be easily understood by those skilled in the art that various modifications can be made thereto without departing from the novel features and advantages of the invention. Therefore, such modifications all fall within the scope of the invention.

What is claimed is:

1. A power transmission control apparatus in a contactless power transmission system where power is transmitted from a power transmission apparatus to a power reception apparatus by electromagnetically coupling a primary coil and a secondary coil, the power transmission control apparatus comprising:
   a signal detection circuit that detects a signal induced in the primary coil; and
   a power transmission control circuit that determines a value of transmission data transmitted from the power reception apparatus by a load modulation, on the basis of an output signal of the signal detection circuit,
   the power transmission control circuit obtaining detection data by detecting the transmission data on the basis of the output signal of the signal detection circuit at every drive clock cycle of the primary coil,
   if a value of the detection value being identical n-times continuously, $n=m+\alpha \leqq p$, the m being an integer equal to or larger than 0, the $\alpha$ being an integer equal to or larger than 1, and the p being an integer equal to or larger than 1,
   the power transmission control circuit determining that the value of the transmission data transmitted by the power reception apparatus being the value of the detection data,
      the load modulation being performed using a drive clock of the primary coil as a timing reference,
      a period from a timing of the load modulation to a time at which a period of m-times one drive clock cycle of the primary coil elapses is defined as a data-undetermined period, the m being an integer equal to or larger than 0, and
      a period of "0" or "1" included in 1 bit transmitted from the power reception apparatus by the load modulation is k×p times of a period of the drive clock cycle of the primary coil, the k being an integer equal to or larger than 1.

2. The power transmission control circuit according to claim 1,
   in a case where values of periodic authentication data including "0" "1" "0" periodically transmitted from the power reception apparatus are determined and where a timing of a change from the "0" to the "1" of the periodic authentication data is a time tx and a timing of a change from the "1" to the "0" is a time when a period of p-times one drive clock cycle of the primary coil has elapsed from the time tx,
   by detecting "1" n-times continuously, the power transmission control circuit determining "1" detection and detecting the change from the "0" to the "1" of the transmission data, and
   by detecting "0" n-times continuously in a period after a period corresponding to (p+m) drive clocks of the primary coil has elapsed from the time tx and before a period corresponding to (2×p) drive clocks of the primary coil elapses from the time tx, the power transmission control circuit determining "0" detection by detecting the change from the "1" to the "0" of the transmission data.

3. The power transmission control apparatus according to claim 2,
   upon first receiving the periodic authentication data, the power transmission control circuit determining the periodic authentication data using a method determining the value of the transmission data by detecting an identical value n-times continuously, and after detecting the change from the "1" to the "0", the power transmission control circuit determining the value of the transmission data every cycle from the timing when the change from the "1" to the "0" has been detected, the cycle being a period corresponding to p drive clocks of the primary coil.

4. The power transmission control circuit according to claim 1,
in a case in which a value of a communication packet transmitted from the power reception apparatus, the communication packet including one of "0" and "1," is determined and in which a period of the "0" or the "1" corresponds to q drive clocks of the primary coil, the q being $\beta \times p$, the $\beta$ being an integer equal to or larger than 2, and a change from the "0" to the "1" occurs at a time ty due to the load modulation performed by the power reception apparatus,
the power transmission control circuit detecting the change from the "0" to the "1" by detecting "1" n-times continuously, and
subsequently, the power transmission control circuit detecting a change from "1" to "1" by detecting "1" n-times continuously in a period after a period corresponding to (p+m) drive clocks of the primary coil has elapsed from the time ty and before a period corresponding to (2×p) drive clocks of the primary coil elapses from the time ty.

5. The power transmission control apparatus according to claim 3,
only for a purpose of determining first one-bit data of the communication packet first received in a state in which initial synchronization between the power transmission apparatus and the power reception apparatus is yet to be established, the power transmission control circuit uses a method determining the value of the transmission data by detecting an identical value n-times continuously, and
by detecting "1" n-times continuously in a period after a period corresponding to (p+m) drive clocks of the primary coil has elapsed from the time ty and before a period corresponding to (2×p) drive clocks of the primary coil elapses from the time ty, the power transmission control circuit determining "1" detection by detecting a change from the "0" to the "1" and thereafter determining the value of the transmission data every cycle, the cycle being a period corresponding to p drive clocks of the primary coil, from one of a timing when the "1" has been determined and a subsequent determination timing determined on the basis of the timing when the "1" has been determined.

6. The power transmission control apparatus according to claim 1,
the m being 5, the n being 7 (therefore, $\alpha$ being 2), and the p being 16.

7. The power transmission control apparatus according to claim 5,
the q being 32 (therefore, the $\beta$ being 2).

8. A power transmission apparatus comprising
the power transmission control apparatus according to claim 1.

9. A contactless power transmission system comprising:
a primary coil;
a secondary coil;
the power transmission apparatus according to claim 8; and
a power reception apparatus that receives power transmitted from the power transmission apparatus via the primary coil and the secondary coil and transmits the power to a load, the load being a subject of power feeding, and transmits data to the power transmission apparatus by a load modulation.

10. A data determination method used by a contactless power transmission system where power is transmitted from a power transmission apparatus to a power reception apparatus by electromagnetically coupling a primary coil and a secondary coil, the method being used when the power transmission apparatus determines a value of transmission data transmitted from the power reception apparatus by a load modulation, the method comprising:
obtaining detection data by detecting the transmission data at every drive clock cycle of the primary coil; and
if a value of the detection value is identical n-times continuously, $n = m+\alpha \leq p$, the m being an integer equal to or larger than 0, the $\alpha$ being an integer equal to or larger than 1, and the p being an integer equal to or larger than 1,
determining that the value of the transmission data transmitted by the power reception apparatus is the value of the detection data,
the load modulation being performed using a drive clock of the primary coil as a timing reference,
a period from a timing of the load modulation to a time at which a period of m-times one drive clock cycle of the primary coil elapses is defined as a data-undetermined period, the m being an integer equal to or larger than 0, and
a period of "0" or "1" included in 1 bit transmitted from the power reception apparatus by the load modulation is k×p times of a period of the drive clock cycle of the primary coil, the k being an integer equal to or larger than 1.

11. The data determination method according to claim 10,
a period from a timing of the load modulation to a time at which a period of m-times one cycle of a drive clock for driving the primary coil elapses is defined as a data-undetermined period, the m being an integer equal to or larger than 0, and
a period of "0" and "1" included in 1 bit transmitted from the power reception apparatus by the load modulation being set to k×p times of a period of the drive clock cycle of the primary coil, the k being an integer equal to or larger than 1.

12. The data determination method according to claim 10, the m being 5, the n being 7 (therefore, $\alpha$ being 2), and the p being 16.

* * * * *